United States Patent
Li et al.

(10) Patent No.: US 10,555,292 B2
(45) Date of Patent: *Feb. 4, 2020

(54) METHOD FOR PROCESSING ENHANCED PHYSICAL DOWNLINK CONTROL CHANNEL, NETWORK-SIDE DEVICE, AND USER EQUIPMENT

(71) Applicant: Huawei Technologies Co., Ltd., Shenzhen, Guangdong (CN)

(72) Inventors: Zhongfeng Li, Shanghai (CN); Zhenfei Tang, Ottawa (CA); Jianmin Lu, Shanghai (CN); Ke Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,018

(22) Filed: Dec. 18, 2017

(65) Prior Publication Data

US 2018/0110034 A1  Apr. 19, 2018

Related U.S. Application Data

(63) Continuation of application No. 14/698,447, filed on Apr. 28, 2015, now Pat. No. 9,867,176, which is a
(Continued)

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/001* (2013.01); *H04L 5/0048* (2013.01); *H04L 5/0094* (2013.01)

(58) Field of Classification Search
CPC ..... H04L 5/001; H04L 5/0053; H04L 5/0048; H04L 5/0094; H04L 5/0035; H04L 5/005;
(Continued)

(56) References Cited

U.S. PATENT DOCUMENTS 6,904,290 B1  6/2005  Palenius
7,346,020 B2  3/2008  Kwon et al.
(Continued)

FOREIGN PATENT DOCUMENTS

CN  1377535 A  10/2002
CN  1533049 A  9/2004
(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 11), 3GPP TS 36.212 V11.0.0, Sep. 2012, 79 pages.
(Continued)

*Primary Examiner* — Paul H Masur
*Assistant Examiner* — Michael K Phillips
(74) *Attorney, Agent, or Firm* — Leydig, Voit & Mayer, Ltd.

(57) ABSTRACT

The present invention provides a method for processing an enhanced physical downlink control channel (EPDCCH), a network-side device, and a user equipment. The method includes: notifying a user equipment (UE) of M physical resource block (PRB) sets used for EPDCCH transmission and N reference signal (RS) configurations used for EPDCCH downlink control information (DCI) rate matching and/or EPDCCH resource mapping, and notifying the UE of correspondence between the M PRB sets and the N RS configurations, where N is a positive integer greater than 1, and M is a positive integer; and performing the EPDCCH
(Continued)

DCI rate matching and/or the EPDCCH resource mapping according to the correspondence between the M PRB sets and the N RS configurations.

17 Claims, 8 Drawing Sheets

Related U.S. Application Data continuation of application No. PCT/CN2012/083774, filed on Oct. 30, 2012.

(58) Field of Classification Search
CPC .. H04L 5/0051; H04W 72/042; H04W 72/04; H04W 24/02; H04W 28/18; H04W 72/12; H04W 88/02; H04W 88/08; H04W 48/12
See application file for complete search history.

(56) References Cited

U.S. PATENT DOCUMENTS

| | | | |
|---|---|---|---|
| 7,480,270 B2 | 1/2009 | Achour et al. | |
| 2003/0210664 A1 | 11/2003 | Achour et al. | |
| 2004/0063399 A1 | 4/2004 | Milbar | |
| 2004/0229641 A1 | 11/2004 | Takagi | |
| 2007/0201395 A1 | 8/2007 | Dick et al. | |
| 2008/0301536 A1 | 12/2008 | Shin et al. | |
| 2009/0207781 A1 | 8/2009 | Sidi et al. | |
| 2009/0270095 A1 | 10/2009 | Heinonen et al. | |
| 2010/0265862 A1 | 10/2010 | Choi et al. | |
| 2011/0038334 A1 | 2/2011 | Huang et al. | |
| 2011/0235603 A1 | 9/2011 | Cheng et al. | |
| 2012/0014315 A1 | 1/2012 | Yang et al. | |
| 2012/0057500 A1 | 3/2012 | Nakayama | |
| 2012/0140667 A1 | 6/2012 | Nakayama | |
| 2012/0230211 A1 | 9/2012 | Sandberg et al. | |
| 2012/0236813 A1 | 9/2012 | Tan | |
| 2012/0281542 A1 | 11/2012 | Xiao | |
| 2012/0287875 A1* | 11/2012 | Kim | H04B 7/024 370/329 |
| 2013/0188558 A1 | 7/2013 | Nam et al. | |
| 2013/0194931 A1 | 8/2013 | Lee et al. | |
| 2013/0258874 A1* | 10/2013 | Khoshnevis | H04L 5/0057 370/252 |
| 2013/0288731 A1* | 10/2013 | Chu | H04B 7/024 455/509 |
| 2015/0100863 A1 | 4/2015 | Pietraski et al. | |
| 2015/0280881 A1* | 10/2015 | Gao | H04W 48/12 370/329 |

FOREIGN PATENT DOCUMENTS

| | | |
|---|---|---|
| CN | 2694638 Y | 4/2005 |
| CN | 2694680 Y | 4/2005 |
| CN | 1798444 A | 7/2006 |
| CN | 2838152 Y | 11/2006 |
| CN | 2857342 Y | 1/2007 |
| CN | 101060380 A | 10/2007 |
| CN | 101154989 A | 4/2008 |
| CN | 101304614 A | 11/2008 |
| CN | 201230316 Y | 4/2009 |
| CN | 101536387 A | 9/2009 |
| CN | 101911575 A | 12/2010 |
| CN | 101924610 A | 12/2010 |
| CN | 101931969 A | 12/2010 |
| CN | 102077497 A | 5/2011 |
| CN | 102118868 A | 7/2011 |
| CN | 102340371 A | 2/2012 |
| CN | 102413477 A | 4/2012 |
| CN | 102594513 A | 7/2012 |
| CN | 102624489 A | 8/2012 |
| CN | 102684820 A | 9/2012 |
| RU | 2330379 C2 | 7/2008 |
| WO | WO 2010057446 A1 | 5/2010 |
| WO | WO 2011041623 A1 | 4/2011 |
| WO | WO 2011053051 A2 | 5/2011 |

OTHER PUBLICATIONS

3rd Generation Partnership Project; Technical Specification Group Radio Access Network; Evolved Universal Terrestrial Radio Access (E-UTRA); Physical Channels and Modulation (Release 11), 3GPP TS 36.211 V11.0.0, Sep. 2012, 106 pages.

3rd Generation Partnership Project; Technical Specification Group Radio Access Network; Evolved Universal Terrestrial Radio Access (E-UTRA); Physical layer procedures (Release 11), 3GPP TS 36.213 V11.0.0, Sep. 2012, 143 pages.

3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331V11.1.0, Sep. 2012, 325 pages.

DCI Multiplexing for E-PDCCH, NEC Group, 3GPP TSG RAN WG1 Meeting #68, Feb. 6-10, 2012, 7 pages.

ePDCCH rate matching/puncturing and colliding signals analysis, Panasonic, 3GPP TSG RAN WG1 Meeting #69, May 21-25, 2012, 3 pages.

LG, "Discussions on the association between antenna ports and ePDCCH", 3GPP, May 21-25, 2012, 3GPP TSG RAN WG1 Meeting #69, R1-122304.

LG, "Handling of mapping of ePDCCH in presence of other signals", 3GPP, May 21-25, 2012, 3GPP TSG RAN WG1 Meeting #69, R 1-122307.

LG, "Signaling for quasi co-location assumptions and POSCH rate matching", 3GPP, Oct. 8-12, 2012, 3GPP TSG RAN WG1 Meeting #?Obis, R1-124316.

Mapping of ePDCCH to RE, Ericsson, ST-Ericsson, 3GPP TSG-RAN WG1 #69, May 21-25, 2012, 4 pages.

Mapping of ePDCCH to RE, Ericsson, ST-Ericsson, 3GPP TSG-RAN WG1 #70bis, Oct. 8-12, 2012, 6 pages.

Motorola Mobility, "EPDCCH Design Aspects", 3GPP, Mar. 26-30, 2012, 3GPP TSG RAN WG1 Meeting #68bis, R1-121583.

Rate matching vs puncturing of ePDCCH, Fujitsu, 3GPP TSG RAN WG1 Meeting #69, May 21-25, 2012, 5 pages.

Huawei et al.; "Updated analysis of EPDCCH search complexity and related simplification"; 3GPP TSG RAN WG1 Meeting #70bis; R1-124161; San Diego, USA; Oct. 8-12, 2012; 5 pages.

\* cited by examiner

METHOD FOR PROCESSING ENHANCED PHYSICAL DOWNLINK CONTROL CHANNEL, NETWORK-SIDE DEVICE, AND USER EQUIPMENT

CROSS-REFERENCE TO RELATED APPLICATIONS

This application is a continuation of U.S. patent application Ser. No. 14/698,447, filed on Apr. 28, 2015, which is a continuation of International Application No. PCT/CN2012/083774, filed on Oct. 30, 2012. All of the afore-mentioned patent applications are hereby incorporated by reference in their entireties.

TECHNICAL FIELD

Embodiments of the present invention relate to the field of radio communications, and in particular, to a method for processing an enhanced physical downlink control channel, a network-side device, and a user equipment.

BACKGROUND

In a long term evolution (LTE) system, a physical downlink control channel (PDCCH) and a physical downlink shared channel (PDSCH) adopt a time division multiplexing manner in a subframe. An enhanced physical downlink control channel (EPDCCH) is introduced in LTE Rel-11. Different from the PDCCH, a time frequency resource that transmits the EPDCCH in a subframe is in a data area, and the EPDCCH and the PDSCH adopt a frequency division multiplexing (FDM) manner.

When the EPDCCH is transmitted on a physical resource block (PRB) or a PRB pair of a subframe, some positions therein might be used to transmit a reference signal (RS), such as a cell-specific reference signal (CRS), a demodulation reference signal (DMRS), or a channel state information reference signal (CSI-RS). Therefore, it is required to consider that a resource element (RE,) corresponding to the RS in a resource area allocated to the EPDCCH cannot be used for EPDCCH transmission, a corresponding encoded output bit needs to adapt a resource available after the RE corresponding to the RS is removed, and meanwhile, the encoded output after modulation is not mapped on the RE, but on a resource other than the RE. Such an adaptation process is called EPDCCH downlink control information (DCI) rate matching and/or EPDCCH resource mapping. In other words, corresponding adaptation and mapping should be performed on the encoded output bit (after modulation) according to a bit (which is modulated as a symbol) that can be borne by a resource corresponding to the encoded output bit and a corresponding resource position. In contrast to the rate matching, when a CRS or a CSI-RS is transmitted on a resource allocated to the EPDCCH, the encoded output does not change correspondingly, and puncturing (puncturing) is performed on a symbol of the EPDCCH on a corresponding RE during resource mapping.

A coordinated multi-point (CoMP) transmission technology is introduced in LTE Rel-11, where a main technology therein is a dynamic point selection (DPS) technology. For example, in a heterogeneous network (HetNet), a micro base station is deployed in a hotspot area in coverage of a macro base station, and the macro base station and the micro base station have the same or different cell identifiers (cell ID). A user equipment (UE) at the edge of the micro base station may dynamically select, according to channel quality, a network node between the macro base station and a neighboring micro base station for transmitting data or control signaling. A candidate network node that can be dynamically selected by a UE to transmit data or control signaling is called a DPS network node, which may include network nodes of a limited number, for example, three network nodes. These network nodes may have the same or different cell IDs.

The following scenario is considered: A size of a CoMP measurement set is 3; the CoMP measurement set includes one macro base station and two micro base stations which have different cell IDs: cell ID n, cell ID n+1, and cell ID n+2; and, offsets of CRSs corresponding to the three base stations sequentially differ by one subcarrier in a frequency domain. In the prior art, a UE at the edge of a micro base station does not dynamically select a node for receiving an EPDCCH, but receives the EPDCCH from a base station (for example, a macro base station) of a serving cell of the UE all the time. Correspondingly, corresponding EPDCCH DCI rate matching and/or EPDCCH resource mapping is performed only on an RS of the macro base station, or corresponding resource mapping is performed only on the RS of the macro base station, where puncturing is performed when the EPDCCH is transmitted on the position. Therefore, by adopting the prior art, a network node cannot be flexibly selected for EPDCCH transmission.

SUMMARY

Embodiments of the present invention provide a method for processing an enhanced physical downlink control channel, a network-side device, and a user equipment, which improve flexibility of EPDCCH transmission.

In a first aspect, a method for processing an enhanced physical downlink control channel is provided and includes: notifying a UE of M PRB sets used for EPDCCH transmission and N RS configurations used for EPDCCH DCI rate matching and/or EPDCCH resource mapping, and notifying the UE of correspondence between the M PRB sets and the N RS configurations, where N is a positive integer greater than 1, and M is a positive integer; and performing the EPDCCH DCI rate matching and/or the EPDCCH resource mapping according to the correspondence between the M PRB sets and the N RS configurations.

With reference to the first aspect, in a first possible implementation manner, the performing the EPDCCH DCI rate matching and/or the EPDCCH resource mapping according to the correspondence between the M PRB sets and the N RS configurations includes: determining at least one RS configuration of the N RS configurations; and performing the EPDCCH DCI rate matching and/or the EPDCCH resource mapping according to the at least one RS configuration and a PRB set corresponding to the at least one RS configuration.

With reference to the first aspect and the first possible implementation manner of the first aspect, in a second possible implementation manner, the correspondence between the M PRB sets and the N RS configurations includes that the M PRB sets correspond to the N RS configurations in a one-to-one manner.

With reference to the first aspect and the first possible implementation manner of the first aspect, in a third possible implementation manner, the correspondence between the M PRB sets and the N RS configurations includes that at least one PRB set of the M PRB sets corresponds to at least two RS configurations of the N RS configurations.

With reference to the third possible implementation manner of the first aspect, in a fourth possible implementation manner, first indication signaling is sent to the UE, where the first indication signaling is used to indicate a first RS configuration that corresponds to each PRB set of the at least one PRB set and is used for the EPDCCH DCI rate matching and/or the EPDCCH resource mapping.

With reference to the first or second or third or fourth possible implementation manner of the first aspect, in a fifth possible implementation manner, the N RS configurations correspond to N different cells or network nodes respectively, and the determining the at least one RS configuration of the N RS configurations includes: selecting the at least one RS configuration according to one or more of channel quality, network load, and spectrum efficiency of the N different cells or network nodes corresponding to the N RS configurations.

With reference to the first aspect and any one of the first to fifth possible implementation manners of the first aspect, in a sixth possible implementation manner, the N RS configurations correspond to N different serving cells respectively, and the N different serving cells have a same carrier frequency and different cell identifiers.

With reference to the first aspect and any one of the first to sixth possible implementation manners of the first aspect, in a seventh possible implementation manner, each RS configuration of the N RS configurations includes one or more of the following: a cell identifier, anRS configuration index, a CRS configuration, a non-zero power (NZP) CSI-RS configuration, a zero power (ZP) CSI-RS configuration, an EPDCCH start time, a multimedia broadcast multicast service single frequency network (MBSFN) subframe configuration, and a carrier index.

With reference to the first aspect and any one of the first to seventh possible implementation manners of the first aspect, in an eighth possible implementation manner, the notifying the UE of correspondence between the M PRB sets and the N RS configurations includes: when each PRB set of the M PRB sets includes a PRB set index, and each RS configuration of the N RS configurations includes an RS configuration index, sending to the UE, second indication signaling which is used to indicate the correspondence between the M PRB sets and the N RS configurations, where the second indication signaling includes the PRB set index of each PRB set of the M PRB sets and an RS configuration index corresponding to the PRB set index of each PRB set of the M PRB sets; or when each PRB set of the M PRB sets includes a PRB set index, sending to the UE, second indication signaling which is used to indicate the correspondence between the M PRB sets and the N RS configurations, where the second indication signaling includes the PRB set index of each PRB set of the M PRB sets and an RS configuration corresponding to the PRB set index of each PRB set of the M PRB sets.

With reference to the first aspect and any one of the first to eighth possible implementation manners of the first aspect, in a ninth possible implementation manner, PRB sets of the M PRB sets may include the same PRB, and when PRBs included in two PRB sets of the M PRB sets are completely the same, the two PRB sets are one PRB set.

In a second aspect, a method for processing an enhanced physical downlink control channel EPDCCH is provided and includes: acquiring, from a network-side device, M physical resource block PRB sets used for EPDCCH transmission, N reference signal RS configurations used for EPDCCH DCI rate matching and/or EPDCCH resource mapping, and correspondence between the M PRB sets and the N RS configurations, where N is a positive integer greater than 1, and M is a positive integer; and performing EPDCCH detection on the M PRB sets respectively according to each PRB set of the M PRB sets and an RS configuration corresponding to each PRB set.

With reference to the second aspect, in a first possible implementation manner, before the performing EPDCCH detection on the M PRB sets respectively according to each PRB set of the M PRB sets and an RS configuration corresponding to each PRB set, the method further includes: performing quasi colocation (QCL, Quasi CoLocation) hypothesis on each PRB set of the M PRB sets.

With reference to the second aspect and the first possible implementation manner of the second aspect, in a second possible implementation manner, the correspondence between the M PRB sets and the N RS configurations includes that the M PRB sets correspond to the N RS configurations in a one-to-one manner.

With reference to the second possible implementation manner of the second aspect, in a third possible implementation manner, the performing QCL hypothesis on each PRB set of the M PRB sets includes: performing the QCL hypothesis according to the RS configuration corresponding to each PRB set of the M PRB sets.

With reference to the second or third possible implementation manner of the second aspect, in a fourth possible implementation manner, the correspondence between the M PRB sets and the N RS configurations includes that at least one PRB set of the M PRB sets corresponds to at least two RS configurations of the N RS configurations.

With reference to the fourth possible implementation manner of the second aspect, in a fifth possible implementation manner, the performing QCL hypothesis on each PRB set of the M PRB sets includes: performing the QCL hypothesis according to the RS configuration corresponding to each PRB set of the M PRB sets, or performing the QCL hypothesis according to the RS configuration that corresponds to each PRB set of the M PRB sets and is used for EPDCCH resource demapping, or performing the QCL hypothesis according to the RS configuration that corresponds to each PRB set of the M PRB sets and is used for the EPDCCH detection.

With reference to the fourth possible implementation manner of the second aspect, in a sixth possible implementation manner, before the performing EPDCCH detection on the M PRB sets respectively according to each PRB set of the M PRB sets and an RS configuration corresponding to each PRB set, the method further includes: receiving first indication signaling that is sent by the network-side device and used to indicate the RS configuration corresponding to the at least one PRB set; and the performing EPDCCH detection on the M PRB sets respectively according to each PRB set of the M PRB sets and an RS configuration corresponding to each PRB set includes: when the at least one PRB set is detected, performing the EPDCCH detection on the at least one PRB set according to the RS configuration indicated by the first indication signaling.

With reference to the fourth possible implementation manner of the second aspect, in a seventh possible implementation manner, the performing EPDCCH detection on the M PRB sets respectively according to each PRB set of the M PRB sets and an RS configuration corresponding to each PRB set includes: when the at least one PRB set is detected, performing the EPDCCH detection on the at least one PRB set respectively according to the at least two RS configurations corresponding to the at least one PRB set.

With reference to any one of the first to seventh possible implementation manners of the second aspect, in an eighth possible implementation manner, each RS configuration of the N RS configurations includes one or more of the following: a cell identifier, an RS configuration index, a CRS configuration, an NZP CSI-RS configuration, a ZP CSI-RS configuration, an EPDCCH start time, an MBSFN subframe configuration, and a carrier index.

With reference to any one of the first to eighth possible implementation manners of the second aspect, in a ninth possible implementation manner, the N RS configurations correspond to N different serving cells respectively, and the N different serving cells have a same carrier frequency and different cell identifiers.

With reference to any one of the first to ninth possible implementation manners of the second aspect, in a tenth possible implementation manner, PRB sets of the M PRB sets may include the same PRB, and when PRBs included in two PRB sets of the M PRB sets are completely the same, the two PRB sets are one PRB set.

In a third aspect, a network-side device is provided and includes: a notifying unit, configured to notify a UE of M PRB sets used for EPDCCH transmission and N RS configurations used for EPDCCH DCI rate matching and/or EPDCCH resource mapping, and notify the UE of correspondence between the M PRB sets and the N RS configurations, where N is a positive integer greater than 1, and M is a positive integer; and a mapping unit, configured to perform the EPDCCH DCI rate matching and/or the EPDCCH resource mapping according to the correspondence between the M PRB sets and the N RS configurations.

With reference to the third aspect, in a first possible implementation manner, the network-side device further includes: a determining unit, configured to determine at least one RS configuration of the N RS configurations, where the mapping unit is specifically configured to perform the EPDCCH DCI rate matching and/or the EPDCCH resource mapping according to the at least one RS configuration and a PRB set corresponding to the at least one RS configuration.

With reference to the third aspect and the first possible implementation manner of the third aspect, in a second possible implementation manner, the correspondence between the M PRB sets and the N RS configurations includes that the M PRB sets correspond to the N RS configurations in a one-to-one manner.

With reference to the third aspect and the first or second possible implementation manner of the third aspect, in a third possible implementation manner, the correspondence between the M PRB sets and the N RS configurations includes that at least one PRB set of the M PRB sets corresponds to at least two RS configurations of the N RS configurations.

With reference to the third possible implementation manner of the third aspect, in a fourth possible implementation manner, the network-side device further includes: a sending unit, configured to send first indication signaling to the UE, where the first indication signaling is used to indicate a first RS configuration that corresponds to each PRB set of the at least one PRB set and is used for the EPDCCH DCI rate matching and/or the EPDCCH resource mapping.

With reference to any one of the first to fourth possible implementation manners of the third aspect, in a fifth possible implementation manner, the N RS configurations correspond to N different cells or network nodes respectively, and the determining unit is specifically configured to: select the at least one RS configuration according to one or more of channel quality, network load, and spectrum efficiency of the N different cells or network nodes corresponding to the N RS configurations.

With reference to the third aspect and any one of the first to fifth possible implementation manners of the third aspect, in a sixth possible implementation manner, the N RS configurations correspond to N different serving cells respectively, and the N different serving cells have a same carrier frequency and different cell identifiers.

With reference to the third aspect and any one of the first to sixth possible implementation manners of the third aspect, in a seventh possible implementation manner, each RS configuration of the N RS configurations includes one or more of the following: a cell identifier, an RS configuration index, a CRS configuration, an NZP CSIRS configuration, a ZP CSI-RS configuration, an EPDCCH start time, an MBSFN subframe configuration, and a carrier frequency index.

With reference to the third aspect and any one of the first to seventh possible implementation manners of the third aspect, in an eighth possible implementation manner, when each PRB set of the M PRB sets includes a PRB set index, and each RS configuration of the N RS configurations includes an RS configuration index, the notifying unit is specifically configured to send to the UE, second indication signaling which is used to indicate the correspondence between the M PRB sets and the N RS configurations, where the second indication signaling includes an index identifier of the M PRB sets and an index identifier of the N RS configurations corresponding to the index identifier of the M PRB sets; or when each PRB set of the M PRB sets includes a PRB set index, the notifying unit is specifically configured to send to the UE, second indication signaling which is used to indicate the correspondence between the M PRB sets and the N RS configurations, where the second indication signaling includes an index identifier of the M PRB sets and the N RS configurations corresponding to the index identifier of the M PRB sets.

With reference to the third aspect and any one of the first to eighth possible implementation manners of the third aspect, in a ninth possible implementation manner, PRB sets of the M PRB sets may include the same PRB, and when PRBs included in two PRB sets of the M PRB sets are completely the same, the two PRB sets are one PRB set.

In a fourth aspect, a user equipment is provided and includes: an acquiring unit, configured to acquire, from a network-side device, M physical resource block PRB sets used for EPDCCH transmission, N reference signal RS configurations used for EPDCCH DCI rate matching and/or EPDCCH resource mapping, and correspondence between the M PRB sets and the N RS configurations, where N is a positive integer greater than 1, and M is a positive integer; and a processing unit, configured to perform EPDCCH detection on the M PRB sets respectively according to each PRB set of the M PRB sets and an RS configuration corresponding to each PRB set.

With reference to the fourth aspect, in a first possible implementation manner, the processing unit is further configured to perform QCL hypothesis on each PRB set of the M PRB sets.

With reference to the fourth aspect and the first possible implementation manner of the fourth aspect, in a second possible implementation manner, the correspondence between the M PRB sets and the N RS configurations includes that the M PRB sets correspond to the N RS configurations in a one-to-one manner.

With reference to the second possible implementation manner of the fourth aspect, in a third possible implementation manner, the processing unit is specifically configured to perform QCL hypothesis according to an RS configuration corresponding to each PRB set of the M PRB sets.

With reference to the second or third possible implementation manner of the fourth aspect, in a fourth possible implementation manner, the correspondence between the M PRB sets and the N RS configurations includes that at least one PRB set of the M PRB sets corresponds to at least two RS configurations of the N RS configurations.

With reference to the fourth possible implementation manner of the fourth aspect, in a fifth possible implementation manner, the processing unit is specifically configured to perform the QCL hypothesis according to the RS configuration corresponding to each PRB set of the M PRB sets, or perform the QCL hypothesis according to an RS configuration that corresponds to each PRB set of the M PRB sets and is used for EPDCCH resource demapping, or perform the QCL hypothesis according to an RS configuration that corresponds to each PRB set of the M PRB sets and is used for the EPDCCH detection.

With reference to the fourth possible implementation manner of the fourth aspect, in a sixth possible implementation manner, the user equipment further includes: a receiving unit, configured to receive first indication signaling that is sent by the network-side device and is used to indicate the RS configuration corresponding to the at least one PRB set, where the processing unit is specifically configured to: when the at least one PRB set is detected, perform the EPDCCH detection on the at least one PRB set according to the RS configuration indicated by the first indication signaling.

With reference to the fourth possible implementation manner of the fourth aspect, in a seventh possible implementation manner, the processing unit is specifically configured to: when the at least one PRB set is detected, perform the EPDCCH detection on the at least one PRB set respectively according to the at least two RS configurations corresponding to the at least one PRB set.

With reference to the fourth aspect and the first to seventh possible implementation manners of the fourth aspect, in an eighth possible implementation manner, each RS configuration of the N RS configurations includes one or more of the following: a cell identifier, an RS configuration index, a CRS configuration, an NZP CSIRS configuration, a ZP CSI-RS configuration, an EPDCCH start time, an MBSFN subframe configuration, and a carrier index.

With reference to the fourth aspect and the first to eighth possible implementation manners of the fourth aspect, in a ninth possible implementation manner, the N RS configurations correspond to N different serving cells respectively, and the N different serving cells have a same carrier frequency and different cell identifiers.

With reference to the fourth aspect and the first to ninth possible implementation manners of the fourth aspect, in a tenth possible implementation manner, PRB sets of the M PRB sets may include the same PRB, and when PRBs included in two PRB sets of the M PRB sets are completely the same, the two PRB sets are one PRB set.

In the embodiments of the present invention, a network-side device configures a PRB set and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

BRIEF DESCRIPTION OF THE DRAWINGS

To describe the technical solutions according to the embodiments of the present invention more clearly, the following briefly introduces accompanying drawings required for describing the embodiments of the present invention. Apparently, the accompanying drawings in the following description show merely some embodiments of the present invention, and persons of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part of rather than all of the embodiments of the present invention. All other embodiments obtained by persons of ordinary skill in the art based on the embodiments of the present invention without creative efforts shall fall within the protection scope of the present invention.

The technical solutions of the present invention can be applied to various communications systems, such as a global system for mobile communications (GSM), a code division multiple access (CDMA) system, wideband code division multiple access (WCDMA), general packet radio service (GPRS), and long term evolution (LTE).

A user equipment may also be referred to as a mobile terminal or a mobile user equipment, which can communicate with one or more core networks through a radio access network (for example, RAN, Radio Access Network). The user equipment may be a mobile terminal, such as a mobile phone (or be referred to as a "cellular" phone) and a computer having a mobile terminal, for example, a portable, pocket-sized, hand-held, computer built-in, or vehicle-mounted mobile apparatus, which exchanges voice and/or data with the radio access network.

Figure 1:
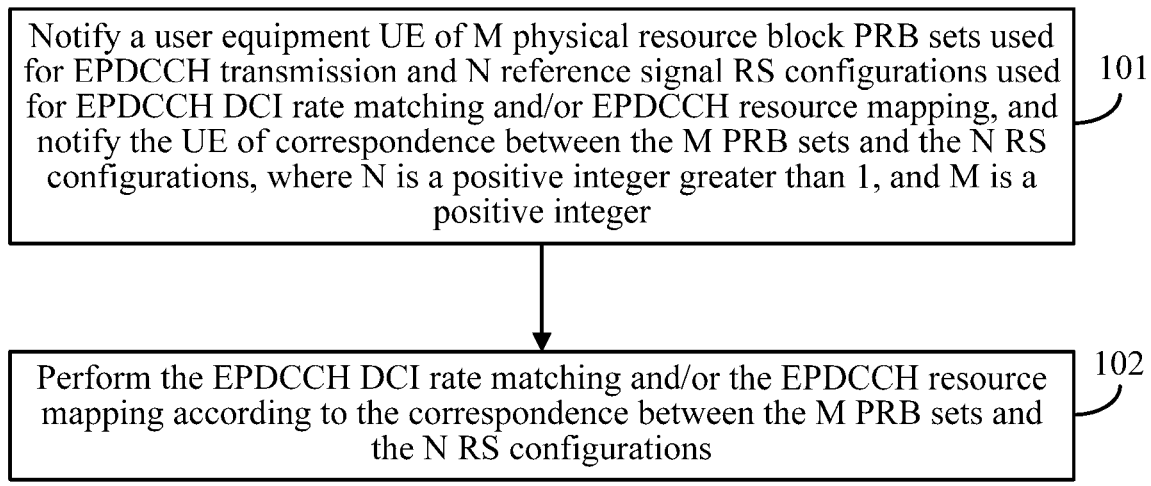
FIG. 1 is a flowchart of a method for processing an EPDCCH according to an embodiment of the present invention.

FIG. 1 is a flowchart of a method for processing an EPDCCH according to an embodiment of the present invention. The method in FIG. 1 is executed by a network-side device. The network-side device may be a node device or a part of the node device which is on a network side and can implement the embodiment of the present invention. For example, when the network-side device is located in an LTE system, the network-side device may be an evolved base station (eNB, evolved Node B) or an evolved universal terrestrial radio access network (E-UTRAN, Evolved Universal Terrestrial Radio Access Network); when the network-side device is located in a WCDMA system, the network-side device may be a radio network controller (RNC) or an evolved universal terrestrial radio access network (UTRAN).

101: Notify a UE of M PRB sets used for EPDCCH transmission and N RS configurations used for EPDCCH DCI rate matching and/or EPDCCH resource mapping, and notify the UE of correspondence between the M PRB sets and the N RS configurations, where N is a positive integer greater than 1, and M is a positive integer.

102: Perform the EPDCCH DCI rate matching and/or the EPDCCH resource mapping according to the correspondence between the M PRB sets and the N RS configurations.

In the embodiment of the present invention, the network side configures a PRB set and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

In step 101, a notification manner and sequence for the N RS configurations, the M PRB sets, and the correspondence between the M PRB sets and the N RS configurations are not limited in the embodiment of the present invention. Simultaneous notification may be adopted, for example, the M PRB sets, the N RS configurations, and the correspondence between the PRB sets and the RS configurations may be carried in one message; or separate notification may also be adopted, for example, the M PRB sets, the N RS configurations, and the correspondence between the PRB sets and the RS configurations may be carried in different messages; or a combination of the above two manners may also be adopted, for example, the M PRB sets and the N RS configurations may be carried in one message, and the correspondence between the M PRB sets and the N RS configurations may be carried in another message. When the separate notification manner is adopted, the notification sequence for the N RS configurations, the M PRB sets, and the correspondence between the M PRB sets and the N RS configurations is not limited in the embodiment of the present invention.

Optionally, as an embodiment, in step 101, a notification may be sent to the UE through RRC (Radio Resource Control, radio resource control) signaling, such as an RRC connection reestablishment message, or may also be sent to the UE through medium access control layer (MAC, Medium Access Control) signaling. However, a specific form of the message that carries the RS configurations, the PRB sets, and the correspondence between them is not limited in the embodiment of the present invention, which, for example, may be newly-added dedicated signaling or another existing signaling that is reused.

It should be noted that in the embodiment of the present invention, a process of the EPDCCH DCI rate matching and/or the EPDCCH resource mapping is as follows: An EPDCCH is transmitted through aggregation of one or more enhanced control channel elements (ECCE, Enhanced Control Channel Element), where the number of the ECCEs may be 1, 2, 4, 8, 16, or 32. Each ECCE is composed of multiple enhanced resource element groups (EREG, Enhanced Resource Element Group), for example, 4 or 8. The EREGs correspond to physical resources. The physical resources may be continuous or discrete. When an RS is located on a subframe for EPDCCH transmission, the physical resources of the EREGs include RS resources. However, when the EPDCCH DCI rate matching and/or the EPDCCH resource mapping is performed, corresponding RS resources should be bypassed or excluded. The EPDCCH DCI rate matching may also be called rate matching of the DCI transmitted by the EPDCCH or rate matching of the DCI borne by the EPDCCH, and may be classified into EPDCCH DCI processing, and EPDCCH rate matching may be classified into EPDCCH processing. The DCI of the EPDCCH is transmitted on the EPDCCH. In addition, it should be noted that in the embodiment of the present invention, the EPDCCH processing includes the EPDCCH DCI rate matching and/or the EPDCCH resource mapping.

Optionally, as an embodiment, the correspondence between the M PRB sets and the N RS configurations may be one-to-one correspondence, where M is equal to N in this case; may also be one-to-many correspondence, for example, one PRB set corresponds to multiple RS configurations; or may also be any combination of the foregoing two types of correspondence, for example, M is equal to 2, N is equal to 2, two PRB sets are PRB set 1 and PRB set 2 respectively, two RS configurations are RS configuration 1 and RS configuration 2 respectively, and the correspondence between them is that PRB set 1 corresponds to both RS configuration 1 and RS configuration 2, and PRB set 2 corresponds to RS configuration 1. A specific form of the correspondence is not limited in the embodiment of the present invention.

Optionally, the N RS configurations may correspond to N cells or network nodes. For example, in a HetNet, two micro base stations are deployed in a hotspot area in coverage of a macro base station, a network-side device notifies a UE of an RS configuration of the macro base station, and also notifies the UE of RS configurations of the two micro base stations, that is, N is equal to 3. When the macro base station and the micro base stations have different cell identifiers, it may be considered that the three RS configurations correspond to three cells respectively, or the three RS configurations correspond to three network nodes respectively. When the macro base station and the micro base stations have the same cell identifier, it may be considered that the N RS configurations correspond to the macro base station and the two micro base stations respectively, that is, three network nodes in total.

Optionally, as another embodiment, the RS configuration may include one or more of: a CRS configuration, an NZP CSI-RS configuration, and a ZP CSI-RS configuration. In addition, the RS configuration may also include one or more of: a cell identifier, an RS configuration index, an EPDCCH start orthogonal frequency division multiplexing (OFDM, Orthogonal Frequency Division Multiplexing) symbol, an MBSFN subframe configuration, a carrier frequency index, and an interference measurement resource (IMR, Interference Measurement Resource) CSI-RS. The element included in the RS configuration is not specifically limited in the present invention. For example, the RS configuration may be composed of the following elements: a cell identifier, an NZP CSI-RS configuration, a ZP CSI-RS configuration, the number of CRS antenna ports, and an MBSFN subframe configuration, where the number of CRS antenna ports may be 1, 2, or 4. The RS configuration may also be composed of the following elements: a ZP CSI-RS configuration, the number of CRS antenna ports, a CRS frequency domain offset, and an MBSFN subframe configuration. The RS configuration may also be composed of the following elements: a ZP CSI-RS configuration, an EPDCCH start time, the number of CRS antenna ports, a CRS frequency domain offset, and an MBSFN subframe configuration.

In addition, the elements of the RS configuration may be determined according to whether the UE is served by a new carrier (NCT, New Carrier Type). When the UE is served by the NCT, and the NCT does not have a PDCCH and has only a CRS antenna port with a period of 5 ms, the RS configuration may be composed of the following elements: cell identifier, CSI-RS configuration, and/or subframe that transmits a CRS; and the RS configuration may also be composed of the following elements: CSI-RS configuration, CRS frequency domain offset, and/or subframe that transmits a CRS. In addition, the RS configuration may also be referred to as a resource mapping parameter.

Optionally, as another embodiment, before the EPDCCH DCI rate matching or the EPDCCH resource mapping is performed according to the correspondence between the M PRB sets and the N RS configurations, at least one RS configuration of the N RS configurations may be further determined. In this case, in step 102, the EPDCCH DCI rate matching and/or the EPDCCH resource mapping may be performed according to the at least one RS configuration and a PRB set corresponding to the at least one RS configuration.

A manner for determining the at least one RS configuration is not limited in the embodiment of the present invention, for example, the at least one RS configuration may be determined according to channel quality, network load, or spectrum efficiency of a cell or network node corresponding to each RS configuration of the N RS configurations.

Optionally, as another embodiment, the network-side device may determine one RS configuration used for the EPDCCH DCI rate matching and/or the EPDCCH resource mapping, and may also determine multiple RS configurations for the EPDCCH DCI rate matching and/or the EPDCCH resource mapping. The number of the RS configurations used for the EPDCCH DCI rate matching and/or the EPDCCH resource mapping is not limited in the embodiment of the present invention. For example, both a first RS configuration and a second RS configuration of the N RS configurations may be determined, and then the EPDCCH DCI rate matching and/or the EPDCCH resource mapping is performed on a PRB set corresponding to the first RS configuration and the second RS configuration.

Optionally, as another embodiment, the correspondence between the M PRB sets and the N RS configurations includes that the M PRB sets correspond to the N RS configurations in a one-to-one manner. In this case, M is equal to N. For example, M is equal to 2, N is equal to 2, PRB set 1 corresponds to RS configuration 1, and PRB set 2 corresponds to RS configuration 2.

Optionally, as another embodiment, the correspondence between the M PRB sets and the N RS configurations includes that at least one PRB set of the M PRB sets corresponds to at least two RS configurations of the N RS configurations. For example, M is equal to 1, N is equal to 2, and PRB set 1 corresponds to both RS configuration 1 and RS configuration 2 of two RS configurations; or, M is equal to 2, N is equal to 2, and both PRB set 1 and PRB set 2 correspond to both RS configuration 1 and RS configuration 2.

Optionally, as another embodiment, the correspondence between the M PRB sets and the N RS configurations may also be a combination of the foregoing two types of correspondence. For example, M is equal to 2, N is equal to 2, PRB set 1 of two PRB sets corresponds to RS configuration 1 and RS configuration 2 of two RS configurations, and PRB set 2 of the two PRB sets corresponds to RS configuration 1 of the two RS configurations.

Optionally, as another embodiment, in the method of FIG. 1, first indication signaling may be further sent to the UE, where the first indication signaling is used to indicate the RS configuration corresponding to the at least one PRB set. For example, PRB set 1 corresponds to both RS configuration 1 and RS configuration 2; in this case, the first indication signaling is sent to the UE, where the first indication signaling is used to instruct the UE that the EPDCCH DCI rate matching and/or the EPDCCH resource mapping is performed on PRB set 1 by using RS configuration 1.

A specific form of the first indication signaling is not limited in the embodiment of the present invention, which, for example, may be RRC signaling or MAC signaling, or may also be dynamic signaling or physical layer signaling, such as enhanced physical control format indicator channel (EPCFICH, Enhanced Physical Control Format Indicator Channel) indication signaling.

Optionally, as another embodiment, the N RS configurations correspond to N different cells or network nodes respectively. When the at least one RS configuration of the N RS configurations is determined, the at least one RS configuration may be selected according to one or more of channel quality, network load, spectrum efficiency, fairness, and interference levels of the N different cells or network nodes corresponding to the N RS configurations.

Optionally, as another embodiment, the N RS configurations correspond to N different serving cells respectively, and the N different serving cells have a same carrier frequency and different cell identifiers.

Optionally, as another embodiment, the network-side device may configure different cells that have a same carrier frequency and different cell identifiers as serving cells, and the N RS configurations may correspond to RS configurations of N serving cells respectively. It should be noted that the network-side device may also configure only one serving cell for the UE, this serving cell includes N RS configurations, and the N RS configurations correspond to another cell or network node.

Optionally, as another embodiment, each RS configuration of the N RS configurations includes one or more of the following: a cell identifier, an RS configuration index, a CRS configuration, an NZP CSIRS configuration, a ZP CSI-RS configuration, an EPDCCH start time, an MBSFN subframe configuration, and a carrier frequency index.

Optionally, as another embodiment, in step 101, when each PRB set of the M PRB sets includes a PRB set index, and each RS configuration of the N RS configurations includes an RS configuration index, second indication signaling which is used to indicate the correspondence between the M PRB sets and the N RS configurations may be sent to the UE, where the second indication signaling includes the PRB set index of each PRB set of the M PRB sets and an RS configuration index corresponding to the PRB set index of each PRB set of the M PRB sets; or when each PRB set of the M PRB sets includes a PRB set index, second indication signaling which is used to indicate the correspondence between the M PRB sets and the N RS configurations may be sent to the UE, where the second indication signaling includes the PRB set index of each PRB set of the M PRB sets and an RS configuration corresponding to the PRB set index of each PRB set of the M PRB sets.

A manner for the network-side device to determine the M PRB sets, the N RS configurations, and the correspondence between the M PRB sets and the N RS configurations is not limited in the embodiment of the present invention. In addition, the RS configuration is a set of factors affecting the EPDCCH DCI rate matching and/or the EPDCCH resource mapping. It may be a independently defined information element, such as a dedicatedly defined RS configuration information element; or may be a logical concept indicating that these factors are included, for example, correspondence between one PRB set and multiple RSs may be directly established, and among the multiple RSs, RSs that belong to the same cell or network node are taken as a logical RS configuration. Correspondingly, the correspondence between the M PRB sets and the N RS configurations may be determined through an association information element, and content of the association information element differs with RS configurations.

If the RS configuration is an independently defined information element, an implementation manner of the M PRB sets, the N RS configurations, and the correspondence between the M PRB sets and the N RS configurations is shown as follow.

First, a PRB set configuration, such as pseudo code 1 in the following, is defined for each PRB set of the M PRB sets.

```
pseudo code 1:
-- ASN1START
--M ePDCCH PRB set configurations
-- ePDCCH PRB resource block releasing
  epdcch-Resource-ToReleaseList
Epdcch-Resource-ToReleaseList
  --ePDCCH PRB resource block modifying and adding
  epdcch-Resource-ToAddModList
Epdcch-Resource-ToAddModList
Epdcch-Resource-ToReleaseList ::= SEQUENCE    (SIZE
(1..maxNum)) OF Epdcchresource-Identity
Epdcch-Resource-ToAddModList ::= SEQUENCE    (SIZE
(1..maxNum)) OF Epdcch-Resource
Epdcch-Resource ::=SEQUENCE {
  epdcchresource-Identity       Epdcchresource-Identity,
  ...
}
-- ASN1STOP
```

SEQUENCE is a structure, Epdcch-Resource::=SEQUENCE indicates a PRB set configuration, and Epdcchresource-Identity indicates that a PRB set index is configured for the PRB set. In addition, maxNum in pseudo code 1 is used to limit an upper limit of the number of PRB sets, which may be predefined or be defined jointly by the network-side device and the UE. In the embodiment of the present invention, M is the number of PRB sets that are actually configured, and its value ranges between 1 and maxNum, including 1 and maxNum.

Next, each RS configuration of the N RS configurations is defined, such as pseudo code 2 in the following.

```
pseudo code 2:
-- ASN1START
--RS configuration
--RS configuration deleting
rsconfig-ToReleaseList         RSconfig-ToReleaseList
RS configuration updating and adding
rsconfig-ToAddModList          RSconfig-ToAddModList
RSconfig-ToReleaseList ::= SEQUENCE (SIZE (1..maxNum)) OF
RSconfig-Identity
```

```
-continued

RSconfig-ToAddModList ::= SEQUENCE (SIZE (1..maxNum)) OF
RS-config
  RS-config ::=SEQUENCE {
    rsconfig-Identity        RSconfig-identity,
    crs-Identity             CRS-Identity,
    csi-rs-Identity          CSI-rs-Identity,
    zp-csi-Identity          ZP-csi-Identity,
    ...
  }
-- ASN1STOP
```

The structure RS-config::=SEQUENCE indicates an independent RS configuration information element. Each RS configuration information element includes an RS configuration index that can be used to configure correspondence with the PRB set. that is, RSconfig-Identity in the pseudo code 2. The RS configuration may further include one or more of the following: a CRS configuration index, an NZP CSI-RS configuration index, a ZP CSI-RS configuration index, a cell identifier, an MBSFN subframe, a carrier frequency index, and an EPDCCH start time. An implementation manner of the CRS configuration, the NZP CSI-RS configuration, and the ZP CSI-RS configuration includes a specific configuration information element, or indicating a corresponding configuration information element through an index, which is not limited in the present invention. maxNum in pseudo code 2 is used to limit an upper limit of the number of RS configurations, which may be predefined or be defined jointly by the network side and the UE. In the embodiment of the present invention, N is the number of RS configuration information elements that are actually configured, and its value ranges between 1 and maxNum, including 1 and maxNum.

Each PRB set configuration includes a PRB set index that is used to configure correspondence with the RS configuration, that is, Epdcchresource-Identity in the foregoing sequence.

Finally, the M PRB set configurations are associated, in a manner described in pseudo code 3, with the RS configurations that are independently defined information elements.

```
pseudo code 3:
-- ASN1START
--define an association between the PRB set and the RS
configuration
  Epdcch-ToReleaseList ::= SEQUENCE (1..maxNum)) OF
Epdcchconfig-Identity,
  Epdcch-ToAddModList ::= SEQUENCE (SIZE (1..maxNum)) OF
Epdcch-config
  Epdcch-config ::= SEQUENCE {
    epdcchconfig-Identity        Epdcchconfig-Identity,
    epdcchresource-Identity      Epdcchresource-Identity,
    rsconfig-Identity            RSconfig-Identity,
    ...
  }
-- ASN1STOP
```

For example, in pseudo code 3, the structure Epdcch-config::=SEQUENCE indicates a correspondence information element, including the PRB set index Epdcchresource-Identity shown in pseudo code 1 and RSconfig-Identity shown in pseudo code 2. Therefore, a PRB set index is associated with an RS configuration index through the correspondence information element. Optionally, when one PRB set corresponds to multiple RS configurations, another correspondence information element may be defined to associate the PRB set index of the PRB set with another RS configuration index. The embodiment of the present invention sets no limitation thereto.

If the RS configuration is a logical concept, an implementation manner of determining the M PRB sets, the N RS configurations, and the correspondence between the M PRB sets and the N RS configurations may be shown as follow.

First, an index of each PRB set of the M PRB sets may be configured in the manner described in pseudo code 1. Details are not repeated herein.

Next, correspondence between the M PRB sets and the N RS configurations may be directly determined, as described in pseudo code 4.

```
pseudo code 4:
-- ASN1START
Epdcch-ToReleaseList ::= SEQUENCE (SIZE (1..maxNum)) OF
Epdcchconfig-Identity,
Epdcch-ToAddModList ::= SEQUENCE (SIZE (1..maxNum)) OF
Epdcch-config
  Epdcch-config ::= SEQUENCE {
    epdcchconfig-Identity       Epdcchconfig-Identity,
    epdcchresource-Identity     Epdcchresource-Identity,
    crs-Identity                CRS-Identity,
    csi-rs-Identity             CSI-rs-Identity,
    zp-csi-Identity             ZP-csi-Identity,
    ...
  }
  IMR-config::=SEQUENCE (SIZE (1..maxNum)) OF IMR-Identity
  ...
-- ASN1STOP
```

Each PRB set index is associated with a complete RS configuration, for example, CRS-Identity, CSI-rs-Identity, and ZP-csi-Identity in pseudo code 4 together form a logical RS configuration. One PRB set index ID may correspond to one or more RS configurations. In addition, maxNum in pseudo code 4 is used to limit an upper limit of the number of correspondence between the PRB set and the RS configuration, which may be predefined or be defined jointly by the network side and the UE.

Optionally, in the embodiment of the present invention, the correspondence between the M PRB sets and the N RS configurations may further include one or more of the following: a scrambled ID of the EPDCCH, an EPDCCH start time, and a QCL indication. The QCL indication may be correspondence between a DMRS of the EPDCCH and the NZP CSI-RS configuration.

Specifically, the EPDCCH start time indicates a start OFDM symbol of an EPDCCH in a subframe. Because the number of symbols occupied by a PDCCH in each subframe may differ with cells or network nodes, and a corresponding EPDCCH start time may also be different, the EPDCCH start time may be added to the configuration of the correspondence. In addition, the EPDCCH start time may be specified by directly specifying the start OFDM symbol of the EPDCCH; or, the number of the OFDM symbols of the PDCCH may be specified first through a PCFICH of a serving cell, and then the start OFDM symbol of the EPDCCH is located behind the PDCCH; or, the EPDCCH start time may also be indicated through cross-carrier scheduling indication signaling, and in this case, the signaling includes a carrier index and the EPDCCH start time. In addition, the start OFDM symbol of the EPDCCH may also be acquired by the UE through detection. For example, the UE obtains a cell identifier of a corresponding cell through each RS configuration, and then detects a PCFICH of the cell, so as to obtain a length of a PDCCH of the cell, that is, obtain the EPDCCH start time of the cell. It should be noted that when the UE is served by an NCT, because the NCT does not have a PDCCH, the EPDCCH may always start from OFDM symbol 0.

The scrambled ID of the EPDCCH is not limited in the embodiment of the present invention, for example, it may be a cell ID or a radio network temporary identifier (RNTI, Radio Network Temporary Identifier) or a value in a certain value range, for example, 0 to 503. There may also be multiple scrambling manners, which are not limited in the present invention. For example, when a cell identifier cell ID is adopted for scrambling, the scrambling may be performed by adopting a manner in formula (1).

$$c_{init}=\lfloor n_s/2 \rfloor 2^9 + N_{ID}^{cell} \tag{1}$$

Or, when an RNTI is adopted for scrambling, a scrambling manner in formula (2) may be adopted.

$$c_{init}=\lfloor n_s/2 \rfloor 2^9 + n_{RNTI} \tag{2}$$

Or, when a UE-specific value $N_{ID}$ in a certain value range, such as 0 to 503, is adopted for scrambling, a scrambling manner in formula (3) may be adopted.

$$c_{init}=\lfloor n_s/2 \rfloor 2^9 + N_{ID} \tag{3}$$

Any combination of the foregoing manners may also be adopted to scramble the EPDCCH. For example, when both a UE-specific value and an RNTI are adopted for scrambling, a scrambling manner in formula (4) may be adopted.

$$c_{init}=(\lfloor n_s/2 \rfloor+1)\cdot(2N_{ID}+1)\cdot 2^{16}+n_{RNTI} \tag{4}$$

Optionally, as another embodiment, PRB sets of the M PRB sets may include the same PRB, and when PRBs included in two PRB sets of the M PRB sets are completely the same, the two PRB sets are one PRB set.

Figure 2:
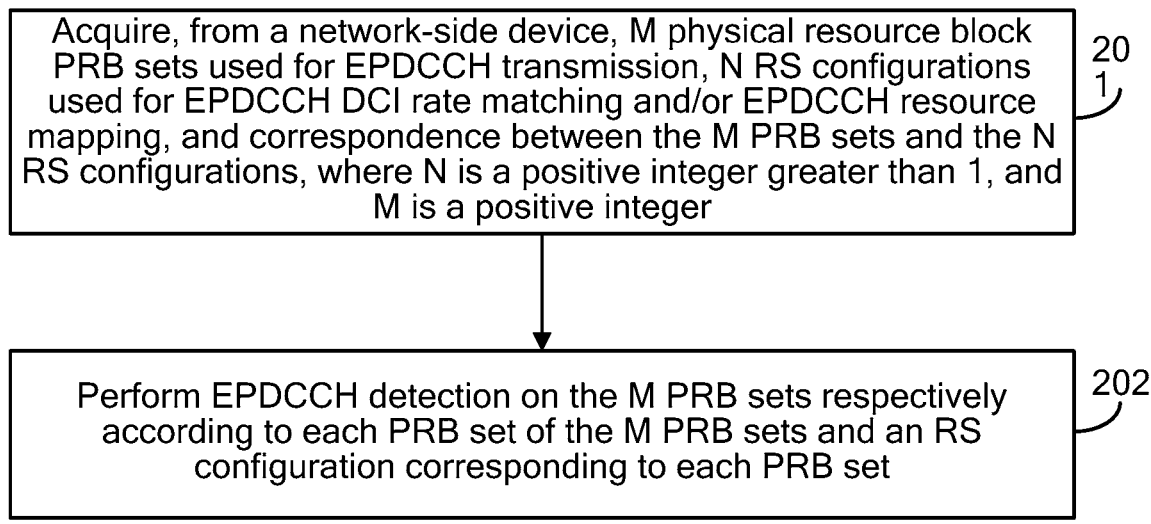
FIG. 2 is a flowchart of a method for processing an EPDCCH according to an embodiment of the present invention.

FIG. 2 is a flowchart of a method for processing an EPDCCH according to an embodiment of the present invention. The method in FIG. 2 is executed by a UE. The embodiment in FIG. 2 corresponds to the embodiment in FIG. 1, and therefore detailed description is properly omitted.

201: Acquire, from a network-side device, M PRB sets used for EPDCCH transmission, N RS configurations used for EPDCCH DCI rate matching and/or EPDCCH resource mapping, and correspondence between the M PRB sets and the N RS configurations, where N is a positive integer greater than 1, and M is a positive integer.

202: Perform EPDCCH detection on the M PRB sets respectively according to each PRB set of the M PRB sets and an RS configuration corresponding to each PRB set.

In the embodiment of the present invention, a network side configures a PRB set and multiple RS configurations corresponding to different cells or network nodes, and notifies a UE of the PRB set, the RS configurations, and the correspondence between them, so that the UE can select a cell or network node used for EPDCCH reception, thereby improving flexibility of EPDCCH transmission.

In the embodiment of the present invention, the detection includes EPDCCH resource demapping and blind detection.

In step 201, a manner and a sequence for the network-side device to obtain the M PRB sets used for EPDCCH transmission, the N RS configurations used for EPDCCH DCI rate matching and/or EPDCCH resource mapping, and the correspondence between the M PRB sets and the N RS configurations are not limited, which may correspond to the notification manner and sequence of the network-side device in step 101.

In step 202, when the UE performs the EPDCCH detection on the M PRB sets respectively, a manner that the detection is stopped once the detection is successful may be adopted, or a manner that the detection is stopped after the detection is completed on all the M PRB sets may also be adopted, which is not limited in the embodiment of the present invention.

Optionally, as an embodiment, in step 202, the RS configuration corresponding to each PRB set of the M PRB sets is configured by the network side, and one PRB set may correspond to one RS configuration, and may also correspond to multiple RS configurations.

Optionally, before step 202, QCL hypothesis may be further performed on each PRB set of the M PRB sets.

Optionally, as another embodiment, the correspondence between the M PRB sets and the N RS configurations includes that the M PRB sets correspond to the N RS configurations in a one-to-one manner.

Optionally, as another embodiment, when the QCL hypothesis is performed on each PRB set of the M PRB sets, the QCL hypothesis may be performed according to the RS configuration corresponding to each PRB set of the M PRB sets. The QCL hypothesis assumes that an EPDCCH DMRS antenna port is in quasi colocation with a type 1 or type 2 RS configuration in an NZP CSI-RS configuration and a CRS configuration in such aspects as delay extension, Doppler extension, Doppler offset, and average delay. Performing the QCL hypothesis helps to improve time frequency tracking performance of the UE.

Optionally, as another embodiment, the correspondence between the M PRB sets and the N RS configurations includes that at least one PRB set of the M PRB sets corresponds to at least two RS configurations of the N RS configurations.

Optionally, as another embodiment, the performing QCL hypothesis on each PRB set of the M PRB sets includes: performing the QCL hypothesis according to the RS configuration corresponding to each PRB set of the M PRB sets, or performing the QCL hypothesis according to an RS configuration that corresponds to each PRB set of the M PRB sets and is used for the EPDCCH resource demapping, or performing the QCL hypothesis according to the RS configuration that corresponds to each PRB set of the M PRB sets and is used for the EPDCCH detection.

Optionally, as another embodiment, before step 202, the UE may further receive indication signaling that is sent by the network-side device and is used to indicate the RS configuration corresponding to the at least one PRB set. In this case, in step 202, when the at least one PRB set is detected, the UE may perform the EPDCCH detection on the at least one PRB set according to the RS configuration indicated by the first indication signaling.

Optionally, as another embodiment, in step 202, when the at least one PRB set is detected, the EPDCCH detection is performed on the at least one PRB set respectively according to at least two RS configurations corresponding to the at least one PRB set.

Optionally, as another embodiment, each RS configuration of the N RS configurations includes one or more of the following: a cell identifier, an RS configuration index, a CRS configuration, an NZP CSIRS configuration, a ZP CSI-RS configuration, an EPDCCH start time, an EPDCCH start time, an MBSFN subframe configuration, and a carrier index.

Optionally, as another embodiment, the N RS configurations correspond to N different serving cells respectively, and the N different serving cells have a same carrier frequency and different cell identifiers.

Optionally, as another embodiment, PRB sets of the M PRB sets may include the same PRB, and when PRBs included in two PRB sets of the M PRB sets are completely the same, the two PRB sets are one PRB set.

The following describes the embodiment of the present invention in more detail with reference to specific examples. It should be noted that examples in FIG. 3 to FIG. 7 are merely intended to help persons skilled in the art understand the embodiment of the present invention, but not intended to limit the embodiment of the present invention to the illustrated specific values or specific scenarios.

Figure 3:
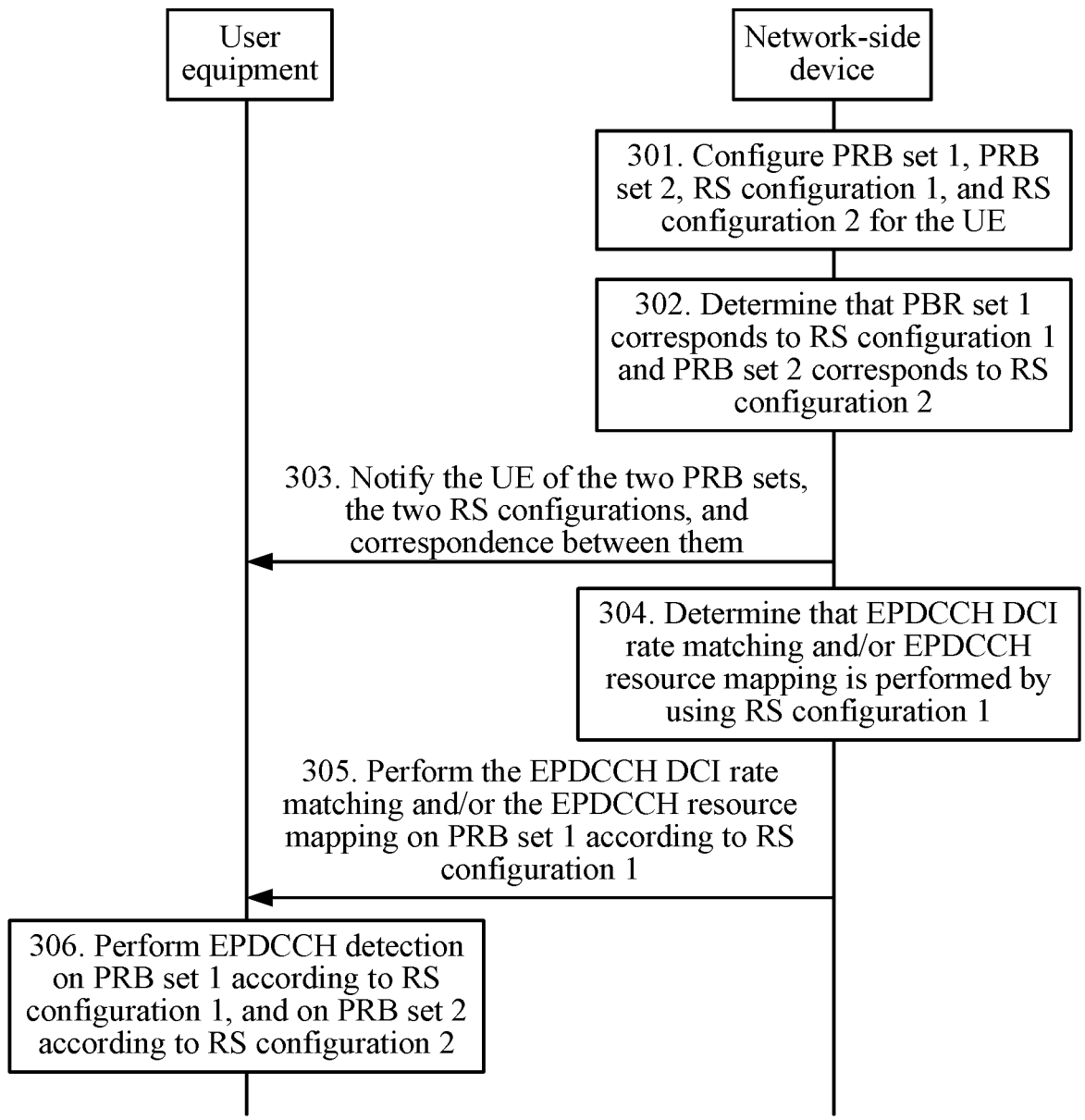
FIG. 3 is a schematic flowchart of a method for processing an EPDCCH according to an embodiment of the present invention.

FIG. 3 is a schematic flowchart of a method for processing an EPDCCH according to an embodiment of the present invention.

301: A network-side device configures PRB set 1, PRB set 2, RS configuration 1, and RS configuration 2 for a UE.

302: The network-side device determines that PRB set 1 corresponds to RS configuration 1 and PRB set 2 corresponds to RS configuration 2.

303: The network-side device notifies the UE of the two PRB sets, the two RS configurations, and correspondence between them.

304: The network-side device determines that EPDCCH DCI rate matching and/or EPDCCH resource mapping is performed by using RS configuration 1.

305: The network-side device performs the EPDCCH DCI rate matching and/or the EPDCCH resource mapping on PRB set 1 according to RS configuration 1.

306: The UE performs EPDCCH detection on PRB set 1 according to RS configuration 1, and on PRB set 2 according to RS configuration 2.

In the embodiment of the present invention, a network side configures PRB sets and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

Figure 4:
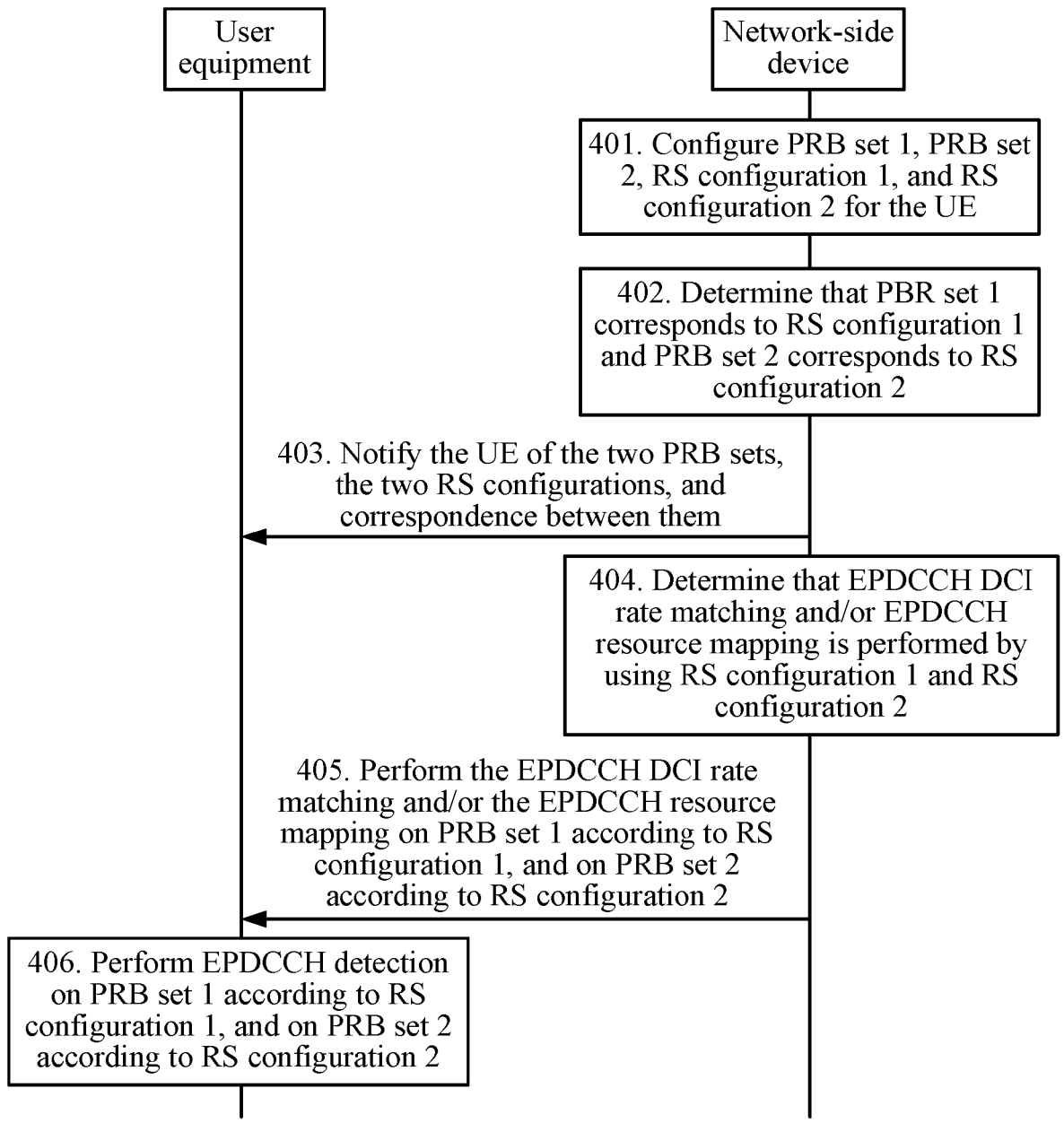
FIG. 4 is a schematic flowchart of a method for processing an EPDCCH according to another embodiment of the present invention.

FIG. 4 is a schematic flowchart of a method for processing an EPDCCH according to another embodiment of the present invention.

401: A network-side device configures PRB set 1, PRB set 2, RS configuration 1, and RS configuration 2 for a UE.

402: The network-side device determines that PBR set 1 corresponds to RS configuration 1 and PRB set 2 corresponds to RS configuration 2.

403: The network-side device notifies the UE of the two PRB sets, the two RS configurations, and correspondence between them.

404: The network-side device determines that EPDCCH DCI rate matching and/or EPDCCH resource mapping is performed by using RS configuration 1 and RS configuration 2.

405: The network-side device performs the EPDCCH DCI rate matching and/or the EPDCCH resource mapping on PRB set 1 according to RS configuration 1, and on PRB set 2 according to RS configuration 2.

406: The UE performs EPDCCH detection on PRB set 1 according to RS configuration 1, and on PRB set 2 according to RS configuration 2.

In the embodiment of the present invention, a network side configure PRB sets and multiple RS configurations corresponding to different cells or network nodes, and notifies a UE of the PRB sets, the RS configurations, and correspondence between them, so that the UE can select a cell or network node used for EPDCCH reception, thereby improving flexibility of EPDCCH transmission.

Figure 5:
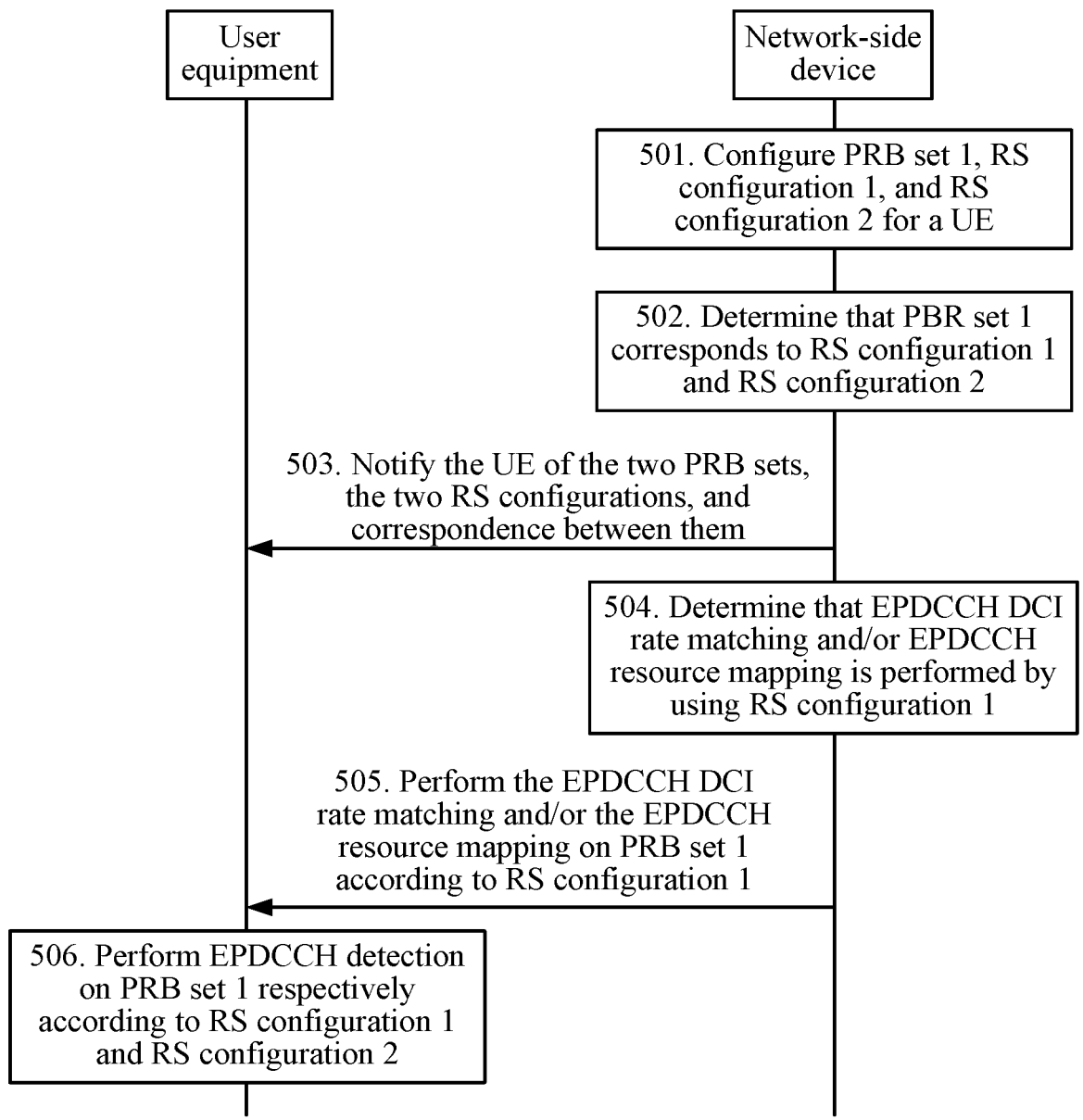
FIG. 5 is a schematic flowchart of a method for processing an EPDCCH according to another embodiment of the present invention.

FIG. 5 is a schematic flowchart of a method for processing an EPDCCH according to another embodiment of the present invention.

501: A network-side device configures PRB set 1, RS configuration 1, and RS configuration 2 for a UE.

502: The network-side device determines that PBR set 1 corresponds to RS configuration 1 and RS configuration 2.

503: The network-side device notifies the UE of the two PRB sets, the two RS configurations, and correspondence between them.

504: The network-side device determines that EPDCCH DCI rate matching and/or EPDCCH resource mapping is performed by using RS configuration 1.

505: The network-side device performs the EPDCCH DCI rate matching and/or the EPDCCH resource mapping on PRB set 1 according to RS configuration 1.

506: The UE performs EPDCCH detection on PRB set 1 respectively according to RS configuration 1 and RS configuration 2.

In the embodiment of the present invention, a network side configures a PRB set and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

Figure 6:
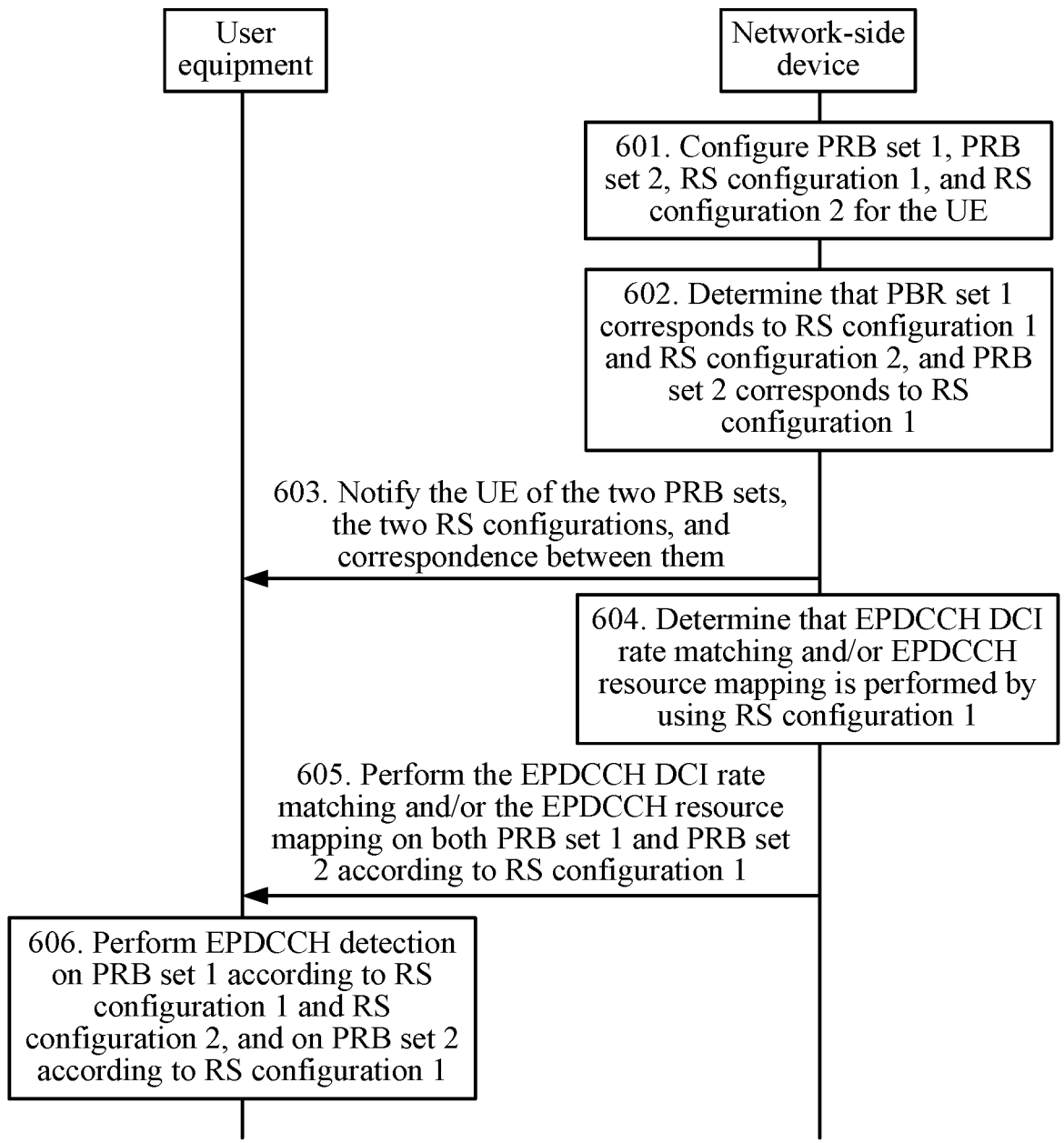
FIG. 6 is a schematic flowchart of a method for processing an EPDCCH according to another embodiment of the present invention.

FIG. 6 is a schematic flowchart of a method for processing an EPDCCH according to another embodiment of the present invention.

601: A network-side device configures PRB set 1, PRB set 2, RS configuration 1, and RS configuration 2 for a UE.

602: The network-side device determines that PBR set 1 corresponds to RS configuration 1 and RS configuration 2, and PRB set 2 corresponds to RS configuration 1.

603: The network-side device notifies the UE of the two PRB sets, the two RS configurations, and correspondence between them.

604: The network-side device determines that EPDCCH DCI rate matching and/or EPDCCH resource mapping is performed by using RS configuration 1.

605: The network-side device performs the EPDCCH DCI rate matching and/or the EPDCCH resource mapping on both PRB set 1 and PRB set 2 according to RS configuration 1.

606: The UE performs EPDCCH detection on PRB set 1 according to RS configuration 1 and RS configuration 2, and on PRB set 2 according to RS configuration 1.

In the embodiment of the present invention, a network side configures PRB sets and multiple RS configurations corresponding to different cells or network nodes, and notifies a UE of the PRB sets, the RS configurations, and correspondence between them, so that the UE can select a cell or network node used for EPDCCH reception, thereby improving flexibility of EPDCCH transmission.

Figure 7:
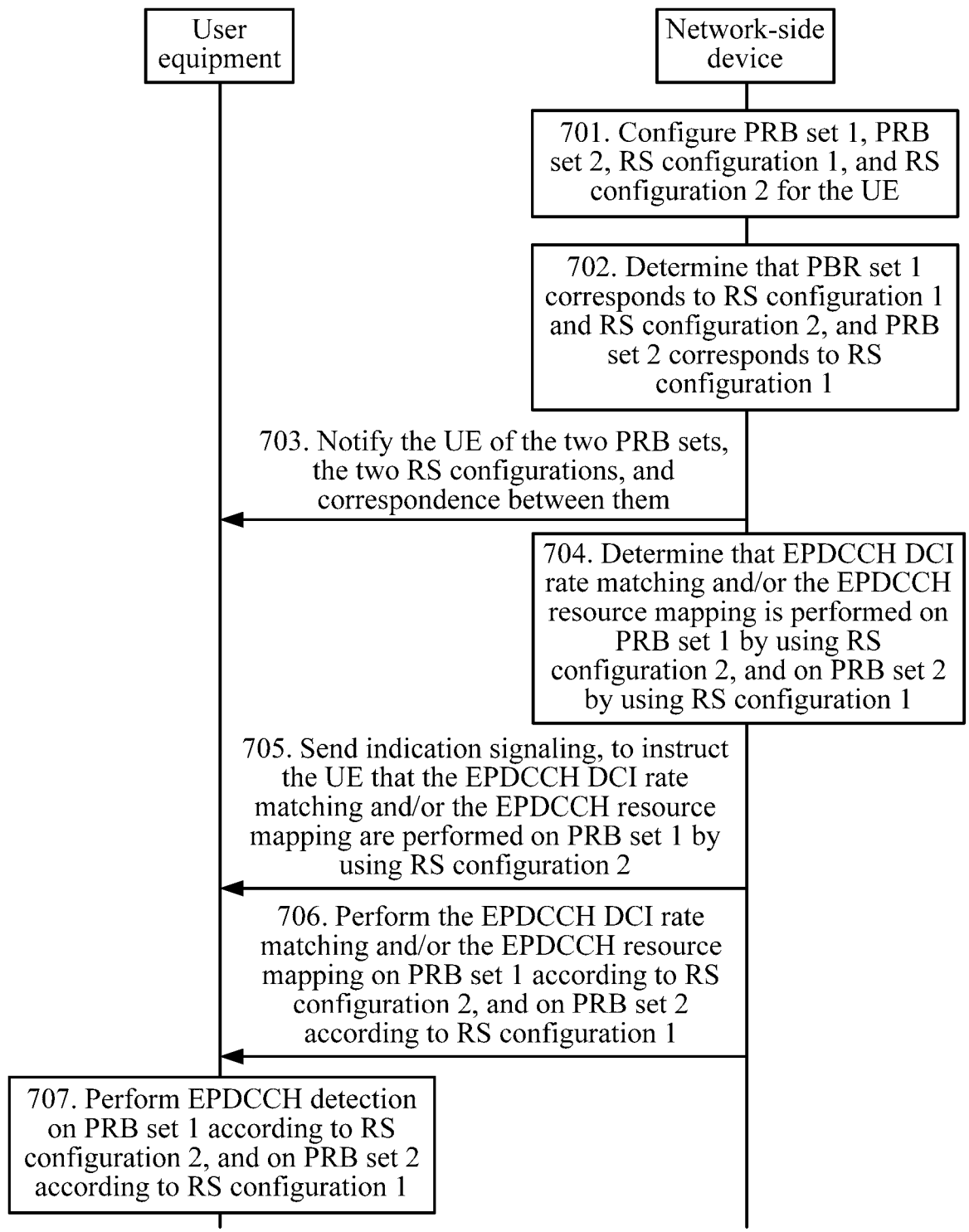
FIG. 7 is a schematic flowchart of a method for processing an EPDCCH according to another embodiment of the present invention.

FIG. 7 is a schematic flowchart of a method for processing an EPDCCH according to another embodiment of the present invention.

701: A network-side device configures PRB set 1, PRB set 2, RS configuration 1, and RS configuration 2 for a UE.

702: The network-side device determines that PBR set 1 corresponds to RS configuration 1 and RS configuration 2, and PRB set 2 corresponds to RS configuration 1.

703: The network-side device notifies the UE of the two PRB sets, the two RS configurations, and correspondence between them.

704: The network-side device determines that EPDCCH DCI rate matching and/or the EPDCCH resource mapping is performed on PRB set 1 by using RS configuration 2, and on PRB set 2 by using RS configuration 1.

705: The network-side device sends indication signaling, to instruct the UE that the EPDCCH DCI rate matching and/or the EPDCCH resource mapping is performed on PRB set 1 by using RS configuration 2.

706: The network-side device performs the EPDCCH DCI rate matching and/or the EPDCCH resource mapping on PRB set 1 according to RS configuration 2, and on PRB set 2 according to RS configuration 1.

707: The UE performs EPDCCH detection on PRB set 1 according to RS configuration 2, and on PRB set 2 according to RS configuration 1.

In the embodiment of the present invention, a network side configures PRB sets and multiple RS configurations corresponding to different cells or network nodes, and notifies a UE of the PRB sets, the RS configurations, and correspondence between them, so that the UE can select a cell or network node used for EPDCCH reception, thereby improving flexibility of EPDCCH transmission.

Figure 8:
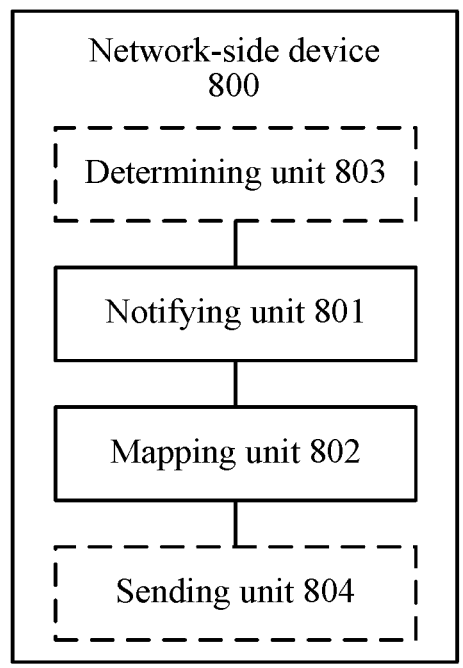
FIG. 8 is a block diagram of a network-side device according to an embodiment of the present invention.

FIG. 8 is a block diagram of a network-side device according to an embodiment of the present invention. A network-side device 800 in FIG. 8 includes a notifying unit 801 and a mapping unit 802, and may further include a determining unit 803 and a sending unit 804.

The notifying unit 801 is configured to notify a UE of M PRB sets used for EPDCCH transmission and N RS configurations used for EPDCCH DCI rate matching and/or EPDCCH resource mapping, and notify the UE of correspondence between the M PRB sets and the N RS configurations, where N is a positive integer greater than 1, and M is a positive integer.

The mapping unit 802 is configured to perform the EPDCCH DCI rate matching and/or the EPDCCH resource mapping according to the correspondence between the M PRB sets and the N RS configurations.

In the embodiment of the present invention, a network side configures PRB sets and multiple RS configurations corresponding to different cells or network nodes, and notifies a UE of the PRB sets, the RS configurations, and correspondence between them, so that the UE can select a cell or network node used for EPDCCH reception, thereby improving flexibility of EPDCCH transmission.

Optionally, the network-side device 800 may further include the determining unit 803 and the sending unit 804.

The determining unit 803 is configured to determine at least one RS configuration of the N RS configurations, where the mapping unit is specifically configured to perform the EPDCCH DCI rate matching and/or the EPDCCH resource mapping according to the at least one RS configuration and a PRB set corresponding to the at least one RS configuration.

The sending unit 804 is configured to send first indication signaling to the UE, where the first indication signaling is used to indicate a first RS configuration that corresponds to each PRB set of the at least one PRB set and is used for the EPDCCH DCI rate matching and/or the EPDCCH resource mapping.

The network-side device in FIG. 8 can implement steps executed by the network-side device in FIG. 1 to FIG. 7. To avoid repetition, no details are provided herein.

Optionally, as an embodiment, the mapping unit 802 is specifically configured to perform the EPDCCH DCI rate matching and/or the EPDCCH resource mapping according to the at least one RS configuration and the PRB set corresponding to the at least one RS configuration.

Optionally, as another embodiment, the correspondence between the M PRB sets and the N RS configurations may include that the M PRB sets correspond to the N RS configurations in a one-to-one manner.

Optionally, as another embodiment, the correspondence between the M PRB sets and the N RS configurations includes that at least one PRB set of the M PRB sets corresponds to at least two RS configurations of the N RS configurations.

Optionally, as another embodiment, the N RS configurations correspond to N different cells or network nodes respectively, and the determining unit 803 selects the at least one RS configuration according to one or more of channel quality, network load, and spectrum efficiency of the N different cells or network nodes corresponding to the N RS configurations.

Optionally, as another embodiment, the N RS configurations correspond to N different serving cells respectively, and the N different serving cells have a same carrier frequency and different cell identifiers.

Optionally, as another embodiment, each RS configuration of the N RS configurations includes one or more of the following: a cell identifier, an RS configuration index, a CRS configuration, an NZP CSIRS configuration, a ZP CSI-RS configuration, an EPDCCH start time, an MBSFN subframe configuration, and a carrier frequency index.

Optionally, as another embodiment, when each PRB set of the M PRB sets includes a PRB set index, and each RS configuration of the N RS configurations includes an RS configuration index, the notifying unit 801 may send to the UE, second indication signaling which is used to indicate the correspondence between the M PRB sets and the N RS configurations, where the second indication signaling includes an index identifier of the M PRB sets and index identifiers of the N RS configurations corresponding to the index identifier of the M PRB sets; or when each PRB set of the M PRB sets includes a PRB set index, the notifying unit 801 may send to the UE, second indication signaling which is used to indicate the correspondence between the M PRB sets and the N RS configurations, where the second indication signaling includes an index identifier of the M PRB sets and the N RS configurations corresponding to the index identifier of the M PRB sets.

Optionally, as another embodiment, PRB sets of the M PRB sets may include the same PRB, and when PRBs included in two PRB sets of the M PRB sets are completely the same, the two PRB sets are one PRB set.

Figure 9:
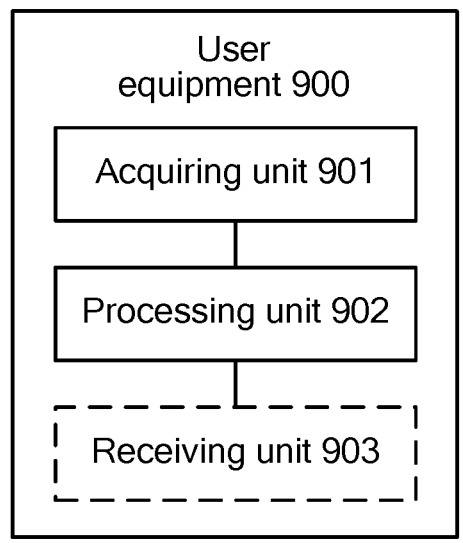
FIG. 9 is a block diagram of a user equipment according to an embodiment of the present invention.

FIG. 9 is a block diagram of a user equipment according to an embodiment of the present invention. A user equipment 900 in FIG. 9 includes an acquiring unit 901 and a processing unit 902.

The acquiring unit 901 may acquire, from a network-side device, M PRB sets used for EPDCCH transmission, N RS configurations used for EPDCCH DCI rate matching and/or EPDCCH resource mapping, and correspondence between the M PRB sets and the N RS configurations, where N is a positive integer greater than 1, and M is a positive integer.

The processing unit 902 may perform EPDCCH detection on the M PRB sets respectively according to each PRB set of the M PRB sets and an RS configuration corresponding to each PRB set.

In the embodiment of the present invention, a network side configures a PRB set and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

Optionally, the user equipment 900 may further include a receiving unit 903. The receiving unit 903 may receive first indication signaling that is sent by the network-side device and is used to indicate the RS configuration corresponding to the at least one PRB set. In this case, the processing unit 902 may perform the EPDCCH detection on a first PRB set according to a first RS configuration when the first PRB set is detected.

The user equipment in FIG. 9 can implement steps executed by the user equipment in FIG. 2 to FIG. 7. To avoid repetition, no details are provided herein.

Optionally, as an embodiment, the processing unit 902 may further perform QCL hypothesis on each PRB set of the M PRB sets.

Optionally, as another embodiment, the correspondence between the M PRB sets and the N RS configurations includes that the M PRB sets correspond to the N RS configurations in a one-to-one manner.

Optionally, as another embodiment, the processing unit 902 may perform the QCL hypothesis according to the RS configuration corresponding to each PRB set of the M PRB sets.

Optionally, as another embodiment, the correspondence between the M PRB sets and the N RS configurations includes that at least one PRB set of the M PRB sets corresponds to at least two RS configurations of the N RS configurations.

Optionally, as another embodiment, the processing unit 902 may perform the QCL hypothesis according to the RS configuration corresponding to each PRB set of the M PRB sets, or perform the QCL hypothesis according to an RS configuration that corresponds to each PRB set of the M PRB sets and is used for EPDCCH resource demapping, or perform the QCL hypothesis according to an RS configuration that corresponds to each PRB set of the M PRB sets and is used for the EPDCCH detection.

Optionally, as another embodiment, the processing unit 902 may perform the EPDCCH detection on the at least one PRB set respectively according to at least two RS configurations corresponding to the at least one PRB set when the at least one PRB set is detected.

Optionally, as another embodiment, each RS configuration of the N RS configurations includes one or more of the following: a cell identifier, an RS configuration index, a CRS configuration, an NZP CSIRS configuration, a ZP CSI-RS configuration, an EPDCCH start time, an MBSFN subframe configuration, and a carrier index.

Optionally, as another embodiment, the N RS configurations correspond to N different serving cells respectively, and the N different serving cells have a same carrier frequency and different cell identifiers.

Optionally, as another embodiment, PRB sets of the M PRB sets may include the same PRB, and when PRBs included in two PRB sets of the M PRB sets are completely the same, the two PRB sets are one PRB set.

Figure 10:
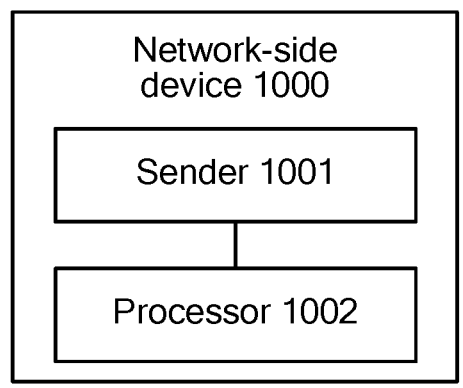
FIG. 10 is a block diagram of a network-side device according to another embodiment of the present invention.

FIG. 10 is a block diagram of a network-side device according to another embodiment of the present invention. A network-side device 1000 in FIG. 10 includes a sender 1001 and a processor 1002.

The sender 1001 is configured to notify a UE of M PRB sets used for EPDCCH transmission and N RS configurations used for EPDCCH DCI rate matching and/or EPDCCH resource mapping, and notify the UE of correspondence between the M PRB sets and the N RS configurations, where N is a positive integer greater than 1, and M is a positive integer.

The processor 1002 is configured to perform the EPDCCH DCI rate matching and/or the EPDCCH resource mapping according to the correspondence between the M PRB sets and the N RS configurations.

In the embodiment of the present invention, a network side configures a PRB set and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

The processor 1002 is further configured to determine at least one RS configuration of the N RS configurations, where the mapping unit is specifically configured to perform the EPDCCH DCI rate matching and/or the EPDCCH resource mapping according to the at least one RS configuration and a PRB set corresponding to the at least one RS configuration.

The sender 1001 is further configured to send first indication signaling to the UE, where the first indication signaling is used to indicate a first RS configuration that corresponds to each PRB set of the at least one PRB set and is used for the EPDCCH DCI rate matching and/or the EPDCCH resource mapping.

The network-side device in FIG. 10 can implement steps executed by the network-side device in FIG. 1 to FIG. 7. To avoid repetition, no details are provided herein.

Optionally, as an embodiment, the processor 1002 may perform the EPDCCH DCI rate matching and/or the EPDCCH resource mapping according to the first RS configuration and a PRB set corresponding to the first RS configuration.

Optionally, as another embodiment, the correspondence between the M PRB sets and the N RS configurations includes that the M PRB sets correspond to the N RS configurations in a one-to-one manner.

Optionally, as another embodiment, the correspondence between the M PRB sets and the N RS configurations includes that at least one PRB set of the M PRB sets corresponds to at least two RS configurations of the N RS configurations.

Optionally, as another embodiment, the N RS configurations correspond to N different cells or network nodes respectively, and the processor 1002 may select the at least one RS configuration according to one or more of channel quality, network load, and spectrum efficiency of the N different cells or network nodes corresponding to the N RS configurations.

Optionally, as another embodiment, the N RS configurations correspond to N different serving cells respectively, and the N different serving cells have a same carrier frequency and different cell identifiers.

Optionally, as another embodiment, each RS configuration of the N RS configurations includes one or more of the following: a cell identifier, an RS configuration index, a CRS configuration, an NZP CSIRS configuration, a ZP CSI-RS configuration, an MBSFN subframe configuration, and a carrier frequency index.

Optionally, as another embodiment, when each PRB set of the M PRB sets includes a PRB set index, and each RS configuration of the N RS configurations includes an RS configuration index, the sender 1001 may send to the UE, second indication signaling which is used to indicate the correspondence between the M PRB sets and the N RS configurations, where the second indication signaling includes an index identifier of the M PRB sets and index identifiers of the N RS configurations corresponding to the index identifier of the M PRB sets; or when each PRB set of the M PRB sets includes a PRB set index, the sender 1001 may send to the UE, second indication signaling which is used to indicate the correspondence between the M PRB sets and the N RS configurations, where the second indication signaling includes an index identifier of the M PRB sets and the N RS configurations corresponding to the index identifier of the M PRB sets.

Optionally, as another embodiment, PRB sets of the M PRB sets may include the same PRB, and when PRBs included in two PRB sets of the M PRB sets are completely the same, the two PRB sets are one PRB set.

Figure 11:
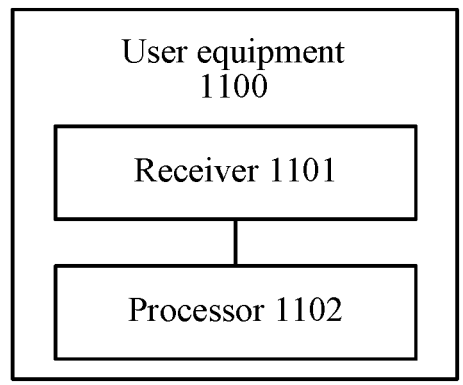
FIG. 11 is a block diagram of a user equipment according to another embodiment of the present invention.

FIG. 11 is a block diagram of a user equipment according to another embodiment of the present invention. A user equipment 1100 in FIG. 11 includes a receiver 1101 and a processor 1102.

The receiver 1101 is configured to acquire, from a network-side device, M physical resource block PRB sets used for EPDCCH transmission, N reference signal RS configurations used for EPDCCH DCI rate matching and/or EPDCCH resource mapping, and correspondence between the M PRB sets and the N RS configurations, where N is a positive integer greater than 1, and M is a positive integer.

The processor 1102 is configured to perform EPDCCH detection on the M PRB sets respectively according to each PRB set of the M PRB sets and an RS configuration corresponding to each PRB set.

In the embodiment of the present invention, a network side configures a PRB set and multiple RS configurations corresponding to different cells or network nodes, and notifies a UE of the PRB set, the RS configurations, and correspondence between them, so that the UE can select a cell or network node used for EPDCCH reception, thereby improving flexibility of EPDCCH transmission.

The receiver 1101 is further configured to receive first indication signaling that is sent by the network-side device and is used to indicate the RS configuration corresponding to the at least one PRB set, where the processing unit is specifically configured to, when the at least one PRB set is detected, perform the EPDCCH detection on the at least one PRB set according to the RS configuration indicated by the first indication signaling.

The network-side equipment in FIG. 11 can implement steps executed by the user equipment in FIG. 2 to FIG. 7. To avoid repetition, no details are provided herein.

Optionally, as an embodiment, the processor 1102 may further perform QCL hypothesis on each PRB set of the M PRB sets.

Optionally, as another embodiment, the correspondence between the M PRB sets and the N RS configurations includes that the M PRB sets correspond to the N RS configurations in a one-to-one manner.

Optionally, as another embodiment, the processor 1102 may perform the QCL hypothesis according to the RS configuration corresponding to each PRB set of the M PRB sets.

Optionally, as another embodiment, the correspondence between the M PRB sets and the N RS configurations includes that at least one PRB set of the M PRB sets corresponds to at least two RS configurations of the N RS configurations.

Optionally, as another embodiment, the processor 1102 may perform the QCL hypothesis according to the RS configuration corresponding to each PRB set of the M PRB sets, or perform the QCL hypothesis according to an RS configuration that corresponds to each PRB set of the M PRB sets and is used for EPDCCH resource demapping, or perform the QCL hypothesis according to an RS configuration that corresponds to each PRB set of the M PRB sets and is used for the EPDCCH detection.

Optionally, as another embodiment, the processor 1102 may perform the EPDCCH detection on the at least one PRB set respectively according to at least two RS configurations corresponding to the at least one PRB set when the at least one PRB set is detected.

Optionally, as another embodiment, each RS configuration of the N RS configurations includes one or more of the following: a cell identifier, an RS configuration index, a CRS configuration, an NZP CSIRS configuration, a ZP CSI-RS configuration, an EPDCCH start time, an MBSFN subframe configuration, and a carrier index.

Optionally, as another embodiment, the N RS configurations correspond to N different serving cells respectively, and the N different serving cells have a same carrier frequency and different cell identifiers.

Optionally, as another embodiment, PRB sets of the M PRB sets may include the same PRB, and when PRBs included in two PRB sets of the M PRB sets are completely the same, the two PRB sets are one PRB set.

Persons of ordinary skill in the art may be aware that, in combination with the examples described in the embodiments disclosed in this specification, units and algorithm steps may be implemented by electronic hardware, or a combination of computer software and electronic hardware. Whether these functions are executed by hardware or software depends on particular applications and design constraint conditions of the technical solution. Persons skilled in the art may use different methods to implement the described functions for each particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the foregoing method embodiments, and the details will not be described herein again.

In several embodiments provided in the present application, it should be understood that the disclosed system, apparatus, and method may be implemented in other manners. For example, the described apparatus embodiments are merely exemplary. For example, the division of the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate components may be or may not be physically separated, and parts displayed as units may be or may not be physical units, that is, may be located in one position, or may be distributed on a plurality of network units. Some or all of the units may be selected to achieve the objective of the solution of the embodiment according to actual needs.

In addition, functional units in the embodiments of the present invention may be integrated into one processing unit, or each of the units may exist alone physically, or two or more units may also be integrated into one unit.

When the function is implemented in a form of a software functional unit and sold or used as an independent product, the function may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The storage medium includes any medium that can store program code, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the present invention. Any variation or replacement readily figured out by persons skilled in the art within the technical scope disclosed in the present invention shall fall within the scope of the present invention. Therefore, the protection scope of the present invention shall be subject to the protection scope of the claims.

What is claimed is:

1. A method for processing an enhanced physical downlink control channel (EPDCCH), the method comprising:
   notifying, by a network side device, a user equipment (UE) of M physical resource block (PRB) sets used for EPDCCH transmission and N reference signal (RS) configurations used for EPDCCH downlink control information (DCI) rate matching and/or EPDCCH resource mapping, and notifying the UE of correspondence between the M PRB sets and the N RS configurations, wherein N is a positive integer greater than 1, and M is a positive integer; and
   performing, by the network side device, the EPDCCH DCI rate matching and/or the EPDCCH resource mapping according to the correspondence between the M PRB sets and the N RS configurations;
   wherein notifying the UE of the correspondence between the M PRB sets and the N RS configurations comprises:
      when each PRB set of the M PRB sets comprises a PRB set index, and each RS configuration of the N RS configurations comprises an RS configuration index, sending to the UE, second indication signaling that indicates the correspondence between the M PRB sets and the N RS configurations, wherein the second indication signaling comprises the PRB set index of each PRB set of the M PRB sets and the RS configuration index corresponding to the PRB set index of each PRB set of the M PRB sets;
   acquiring, by the UE, the M PRB sets, the N RS configurations, and the correspondence between the M PRB sets and the N RS configurations; and
   performing, by the UE, EPDCCH detection on the M PRB sets respectively according to each PRB set of the M PRB sets and an RS configuration corresponding to each PRB set.

2. The method according to claim 1, wherein performing the EPDCCH DCI rate matching and/or the EPDCCH resource mapping according to the correspondence between the M PRB sets and the N RS configurations comprises:

determining at least one RS configuration of the N RS configurations; and performing the EPDCCH DCI rate matching and/or the EPDCCH resource mapping according to the at least one RS configuration and a PRB set corresponding to the at least one RS configuration.

3. The method according to claim 1, wherein the correspondence between the M PRB sets and the N RS configurations comprises that the M PRB sets correspond to the N RS configurations in a one-to-one manner.

4. The method according to claim 1, wherein the correspondence between the M PRB sets and the N RS configurations comprises that at least one PRB set of the M PRB sets corresponds to at least two RS configurations of the N RS configurations.

5. The method according to claim 4, further comprising:
sending first indication signaling to the UE for indicating a first RS configuration that corresponds to each PRB set of the at least one PRB set and for the EPDCCH DCI rate matching and/or the EPDCCH resource mapping.

6. The method according to claim 2, wherein the N RS configurations correspond to N different cells or network nodes respectively, and determining at least one RS configuration of the N RS configurations comprises:
selecting the at least one RS configuration according to one or more of channel quality, network load, and spectrum efficiency of the N different cells or network nodes corresponding to the N RS configurations.

7. The method according to claim 1, wherein the N RS configurations correspond to N different serving cells respectively, and the N different serving cells have a same carrier frequency and different cell identifiers.

8. The method according to claim 1, wherein each RS configuration of the N RS configurations comprises one or more of the following:
a cell identifier, the RS configuration index, a cell specific reference signal (CRS) configuration, a non-zero power channel state information reference signal (NZP CSI-RS) configuration, a zero power (ZP) CSI-RS configuration, an EPDCCH start time, a multimedia broadcast multicast service single frequency network (MBSFN) subframe configuration, and a carrier frequency index.

9. The method according to claim 1, wherein PRB sets of the M PRB sets may comprise the same PRB, and when PRBs comprised in two PRB sets of the M PRB sets are the same, the two PRB sets are one PRB set.

10. A system for processing an enhanced physical downlink control channel (EPDCCH), the system comprising:
a network-side device; and
a user equipment (UE);
wherein the network-side device is configured to:
notify the UE of M physical resource block (PRB) sets for enhanced physical downlink control channel (EPDCCH) transmission and N reference signal (RS) configurations for EPDCCH downlink control information (DCI) rate matching and/or EPDCCH resource mapping,
notify the UE of correspondence between the M PRB sets and the N RS configurations, wherein N is a positive integer greater than 1, and M is a positive integer, and
perform the EPDCCH DCI rate matching and/or the EPDCCH resource mapping according to the correspondence between the M PRB sets and the N RS configurations, wherein when each PRB set of the M PRB sets comprises a PRB set index, and each RS configuration of the N RS configurations comprises an RS configuration index, the network-side device is configured to send to the UE, second indication signaling that indicates the correspondence between the M PRB sets and the N RS configurations, wherein the second indication signaling comprises an index identifier of the M PRB sets and index identifiers of the N RS configurations corresponding to the index identifier of the M PRB sets;

wherein the UE is configured to:
acquire the M PRB sets, N RS configurations and the correspondence between the M PRB sets and the N RS configurations, and
perform EPDCCH detection on the M PRB sets respectively according to each PRB set of the M PRB sets and an RS configuration corresponding to each PRB set.

11. The system according to claim 10, wherein the network side device is further configured to:
determine at least one RS configuration of the N RS configurations; and
perform the EPDCCH DCI rate matching and/or the EPDCCH resource mapping according to the at least one RS configuration and a PRB set corresponding to the at least one RS configuration.

12. The system according to claim 10, wherein the correspondence between the M PRB sets and the N RS configurations comprises that the M PRB sets correspond to the N RS configurations in a one-to-one manner.

13. The system according to claim 10, wherein the network-side device is further configured to:
send first indication signaling to the UE for indicating a first RS configuration that corresponds to each PRB set of at least one PRB set and is for the EPDCCH DCI rate matching and/or the EPDCCH resource mapping.

14. The system according to claim 10, wherein each RS configuration of the N RS configurations comprises one or more of the following:
a cell identifier, the RS configuration index, a CRS configuration, an NZP CSIRS configuration, a ZP CSI-RS configuration, an EPDCCH start time, a multimedia broadcast multicast service single frequency network MBSFN subframe configuration, and a carrier frequency index.

15. The system according to claim 10, wherein the UE is further configured to perform quasi colocation (QCL) hypothesis on each PRB set of the M PRB sets.

16. The system according to claim 10, wherein the UE is configured to perform quasi colocation (QCL) hypothesis according to the RS configuration corresponding to each PRB set of the M PRB sets.

17. A non-transitory computer-readable storage medium comprising instructions that, when executed by a computer, cause the computer to:
notify a user equipment (UE) of M physical resource block (PRB) sets for enhanced physical downlink control channel (EPDCCH) transmission and N reference signal (RS) configurations for EPDCCH downlink control information (DCI) rate matching and/or EPDCCH resource mapping;
notify the UE of correspondence between the M PRB sets and the N RS configurations, wherein N is a positive integer greater than 1, and M is a positive integer; and
configured to perform the EPDCCH DCI rate matching and/or the EPDCCH resource mapping according to the correspondence between the M PRB sets and the N RS configurations, wherein when each PRB set of the M PRB sets comprises a PRB set index, and each RS configuration of the N RS configurations comprises an RS configuration index, send to the UE a second indication signaling that indicates the correspondence between the M PRB sets and the N RS configurations, wherein the second indication signaling comprises an index identifier of the M PRB sets and index identifiers of the N RS configurations corresponding to the index identifier of the M PRB sets;

acquire the M PRB sets, N RS configurations and the correspondence between the M PRB sets and the N RS configurations; and perform EPDCCH detection on the M PRB sets respectively according to each PRB set of the M PRB sets and an RS configuration corresponding to each PRB set.

* * * * *